United States Patent
Miley et al.

(10) Patent No.: US 6,171,451 B1
(45) Date of Patent: Jan. 9, 2001

(54) METHOD AND APPARATUS FOR PRODUCING COMPLEX CARBON MOLECULES

(75) Inventors: George H. Miley, Champaign, IL (US); John Sved, Delmenhorst (DE); Brian E. Jurczyk, Urbana, IL (US)

(73) Assignee: DaimlerChrysler Aerospace, Bremen (DE)

( * ) Notice: Under 35 U.S.C. 154(b), the term of this patent shall be extended for 0 days.

(21) Appl. No.: 09/341,458
(22) PCT Filed: Jan. 13, 1998
(86) PCT No.: PCT/US98/00147
§ 371 Date: Sep. 13, 1999
§ 102(e) Date: Sep. 13, 1999
(87) PCT Pub. No.: WO98/30495
PCT Pub. Date: Jul. 16, 1998

Related U.S. Application Data
(60) Provisional application No. 60/034,491, filed on Jan. 13, 1997.

(51) Int. Cl.[7] .............................. B01J 19/08; C01B 31/00
(52) U.S. Cl. ................. 204/173; 422/186.04; 423/445 B
(58) Field of Search ....................... 204/173; 422/186.04; 423/445 B

(56) References Cited

U.S. PATENT DOCUMENTS
| | | | |
|---|---|---|---|
| 5,227,038 | * | 7/1993 | Smalley et al. ................. 204/173 |
| 5,445,800 | * | 8/1995 | Isoda et al. ................. 422/186.3 |

FOREIGN PATENT DOCUMENTS
WO 95/30235 * 11/1995 (WO) .

* cited by examiner

Primary Examiner—Kishor Mayekar
(74) Attorney, Agent, or Firm—Sughrue, Mion, Zinn, Macpeak & Seas, PLLC

(57) ABSTRACT

A device (100) for producing fullerenes includes an IEC vacuum chamber (110) which has a central grid-like electrode (112) and a conductive outer shell (111) that are connected to a pulsed source of high voltage (114) and provide an electric field within the chamber (110). The applied voltage supports the creation of a plasma at the inner core of the chamber near the electrode (112). A carbon-based gas, which is introduced into the chamber (110), possibly along with an inert buffer gas, id dissociated into component carbon and hydrogen ions that are separated and the carbon ions recombined into fullerenes that appears as a soot. The device (100) includes a soot extraction mechanism for removing and collecting the fullerenes.

71 Claims, 14 Drawing Sheets

METHOD AND APPARATUS FOR PRODUCING COMPLEX CARBON MOLECULES

This application claims domestic priority from U.S. Provisional Application Ser. No.: 60/034,491 filed Jan. 13, 1997, and the entire content of that application is incorporated herein by reference.

BACKGROUND OF THE INVENTION

The present invention concerns a method and apparatus for producing complex carbon molecules and, in particular, a method and apparatus that utilizes the plasma within an inertial electrostatic confinement (IEC) device to convert a carbon-based gas into "buckey-balls" or fullerene $C_{60}$ and sister molecules.

The IEC was originally developed as a neutron source for activation analysis as reported in G. H. Miley, J. B. Javedani, R. Nebel, J. Nadler, Y. Gu, A. J. Satsangi, and P. Heck, "An Inertial Electrostatic Confinement Neutron/Proton Source," Third International Conference on Dense Z-pinches, eds. Malcom Haines and Andrew Knight, AIP Conference Proceeding No. 299, AIP Press, New York, 675–689 (1994). For such application, when a gas is introduced into the chamber in the tens of mTorr pressure range, a plasma discharge is created by applying high voltage (10–100 kV) to the grid. The grid also serves to extract ions from the discharge and accelerate them toward the center of the device, where a dense, high-temperature plasma is formed. The potential surfaces are shaped such that ions are trapped and recirculated, creating a highly non-thermal plasma with energetic (kV) ions and lower-energy background electrons. The resulting plasma provides several unique opportunities for plasma processing, either using in situ methods or employing radiation emitted from the dense core region.

An inertial electrostatic confinement (IEC) particle generator is described in U.S. patent application Ser. No. 08/232,764 (Miley et al.) which was filed on Apr. 25, 1994 and is incorporated herein by reference. The inertial electrostatic confinement device disclosed therein includes a metallic vacuum vessel which is held at ground potential and contains internally and concentric to the vessel, a wire grid which acts as a cathode. The cathode may be made from a variety of metals having structural strength and appropriate secondary electron and thermionic electron coefficients. The cathode wire grid is connected to a power source to provide a high negative potential (30 kV–70 kV), while the vessel itself is conductive and maintained at a ground potential. Deuterium or a mixture of deuterium and tritium gas is introduced into the vessel. A voltage is applied to the cathode wire grid and the pressure is adjusted in order to initiate a glow discharge. To maximize the neutron yield per unit power input while maximizing grid life-time by reducing collisions with a grid, operational conditions are used to create a "star" glow discharge mode. The glow discharge generates ions which are extracted from the discharge by the electric field created by the cathode grid. These ions are accelerated through the grid openings and focused at a spot in the center of the spherical device. The resulting high energy ions interact with the background gas (beam-background collisions) and themselves (beam-beam collisions) in a small volume around the center spot, resulting in a high rate of fusion reactions. The result is a neutron generator producing neutrons as one of the D-D or D-T fusion reaction products. Where the extraction rates are high, the extracted ions may provide a deep-self generated potential well that confines trapped beam ions, creating even higher reaction rates. The device may be modified by using a field gas mixture of deuterium and helium-3 to be a source of protons rather than neutrons. One geometrical form of the device is spherical and is seen in FIG. 1. This device is based upon the principle of an ion accelerator with a plasma target. In a neutron-generator embodiment, deuterium-deuterium fusion reactions take place in the plasma target zone and produce energetic neutrons. The device acts as a simple spherical plasma diode, having a ground potential on the outer sphere and a negative potential on a nearly geometrically transparent inner spherical grid. The spherical inertial electrostatic confinement device 10 is illustrated in FIG. 1 where a conductive vacuum chamber 11 is connected to a ground potential at contact 17. The device has a cathode grid 12 that defines a small sphere within the chamber and has a grid design that provides a high geometric transparency. In operation, however, this grid design has an even higher effective ion transparency, due to the effect of a concentration of ions into "microchannels", as subsequently described. A source of power 14 is connected by a high voltage feed-through to the internal cathode grid 12. The voltage has a negative value, thereby providing a bias between the relatively positive walls of the vacuum chamber and the central grid area. Gas is introduced into the vacuum chamber 11 by a control valve 15 and is evacuated by a pump 18, providing a means of controlling the gas pressure in the chamber.

Upon application of a potential to the cathode grid, under certain grid-voltage, gas pressure, gas type and grid-configuration conditions, high density ions and electron beams will form within the IEC device initiating a "star" mode of operation. In this mode, high density space charged neutralized ion beams are formed into microchannels that pass through the open spaces between the grid wires. As the ions avoid contact with the wires, this mode increases the effective grid transparency to a level above the geometric value. These microchannels significantly reduce grid bombardment and erosion and increase power efficiency. For conventional star mode operation, the grid and microchannel beams are symmetric so that a convergent high-density core develops. The inertial electrostatic confinement device serves as a valuable source of neutrons or protons.

Non-thermal plasma production in the IEC leads to several other quite different but possible applications. One that has been explored to date is the production of ultraviolet (UV) radiation. The device provides a high-intensity UV-radiation source if heavy gases, such as krypton or xenon, are used. Another application is the use of the IEC to create thrust by flowing the plasma out through a channel created by an enlarged grid wire opening. A process chamber using a quartz window to contain the flowing fluid under treatment has been designed and both of the foregoing applications are disclosed in a provisional application Ser. No. 60/030,009 filed on Nov. 1, 1996 and entitled Ion Jet Thruster Using Inertial Electrostatic Confinement Discharge Plasma, and PCT Application No. PCT/US97/19306; filed on Oct. 31, 1997 and entitled "Plasma Jet Source Using an Inertial Electronstatic Confinement Discharge Plasma", which are incorporated herein by reference. The application of the IEC structure to the production of fullerene also has been explored.

Carbon-60 was discovered in 1985 and was found to have three-dimensional, cage-like, all-carbon molecules in a gas phase carbon cluster. These even-numbered soccerball-shaped robust molecules were named "fullerenes" after R. Buckminster Fuller, the American architect who pioneered geodesic design. Since that time, there have been only a limited number of studies and papers presented on the subject of fullerene production and theory due to the relative unavailability of the all-carbon materials. Nonetheless, it was also found that in addition to the originally identified carbon-60 and carbon-70, there were hosts of other stable carbon configurations ranging from carbon-24 up to carbon-240 and beyond. Moreover, within the past 5 years, there have been modest strides in the production of carbon-60 and carbon-70 and limited yields of the higher and lower order carbon molecules.

Recently, the demand for fullerenes has been growing due to their potential applications. Many advanced materials currently in use show only a single application, but fullerenes show a series of applications, which include their use as superconductors, anti-AIDS drugs, catalysts and catalyst supports, photoconductors, optical limiters, adsorbents, precursors to synthetic diamonds, and plant growth regulators. Additionally, a major thrust of fullerene research is to exploit its use for energy production. Recent studies show that carbon-60 is a good hydrogen storage medium and can attach more hydrogen atoms (up to 48) per single storage molecule as compared with conventionally used storage material like palladium. Another area that is related to energy production is the use of carbon-60 as battery electrodes. Fullerene-based electrodes would be light in weight and comparable with conventional nickel-oxide electrodes in efficiency. Finally, Carbon-60 has also been thought of as an excellent candidate for many new applications in the near future, such as molecular ball bearings for ships and as a propellant for electric thrusters on satellites. By far the most advanced concept is in the realm of microstructures-the nanotube-wherein an all-carbon linked structure that is completely cylindrical and tubular, can have metallic and semiconductor properties.

Production of fullerene to achieve these results has been approached on both a theoretical and practical level. For example, the method of formation of the fullerene carbon molecules has been subject to several theories. One theory is that graphite exists in the form of sheets that are made up of pentagons and hexagons and, as a result of a physical tendency for such structures to gravitate toward the lowest energy levels, bend to eliminate their highly energetic dangling bonds, present at the edges of the growing structure following the "Pentagon road rule" discussed by Smalley (Smalley, R. E.; "Self-assembly of the fullerenes" Acc.Chem.Res 25:98–105, 1992). Closure of these bent or curled graphite sheets results in the formation of a closed spheroidal cage of carbon atoms. (Zhang et al. "Reactivity of large carbon clusters: Spheroidal carbon shells and their possible relevance to the formation and morphology of soot"; J. Phys. Chem. 90–525, 1986).

Fullerene was first produced in the hot carbon plasma generated during laser ablation of graphite by time-of-flight mass spectroscopy. Since then there have been several other attempts at fullerene production. In 1990, Kratschner et al ("Solid C-60: A new form of carbon"; Nature 347:354–358, 1990) disclosed a simple method for the production of macroscopic quantities of carbon-60 by resistive heating of graphite in an inert atmosphere. Since that time, this method has been continuously improved by subsequent changes in reactor size, rate of graphite rod consumption, and helium pressure. U.S. Pat. No. 5,534,232 teaches the introduction of carbon halides into a plasma torch, which disassociates molecules into carbon and halogen atoms, forming a carbon cloud that condenses into a soot containing fullerenes. However, the halogen atoms can enter into the condensation process, preventing the formation of C-60 in some instances, thus reducing the overall production efficiency. Also, in that case, there is no use of a potential field and the plasma in the torch is Maxwellian. Japanese published application No. 61-73891 also concerns the use of a plasma to produce fullerenes, but does not use a potential field in the separation process. Other patents, including U.S. Pat. Nos. 5,510,098, 5,316,636, 5,494,558 and 5,395,496, use various processes to vaporize carbon rods, producing carbon atoms that recombine into fullerenes.

For larger-scale production, Peters et al ("A new fullerene synthesis" Agnew. Chem.Int.Ed.Engl. 31:223–224, 1992) developed a thermal vaporization technique using a high-frequency oven which gave modest yields of carbon-60 at temperatures of 2700C, and this approach has been extended to the vaporization of graphite using intense sunlight. Other vaporization techniques involved arcing either by brief contact of conducting graphite rods or by means of a plasma discharge (Parker et al., "High yield synthesis, separation and mass spectrometric characterization of fullerene C60–C266", J.Am.Chem.Soc. 113:7499–7503, 1991). A direct current furnace has been used to give highly enriched carbon-70 and significant amounts of other-order carbon molecules have been produced by electron beam evaporation processes. To date, however, none of these approaches have demonstrated sufficient efficiency so as to be considered economically attractive.

In addition to using graphite as the host material, coal has been used as the starting material with a laser evaporation process then used to start a whole new regime of carbon formation using any carbonaceous material. Formation through the combustion or pyrolysis of aromatic hydrocarbons like benzene, as disclosed by Taylor et al. "Formation of C60 by pyrolysis of naphthalene", Nature 366:728–731, 1993).

The production of fullerene in the foregoing setups has been limited in quantity of material and efficiency. Of the "soot" that is collected, it is comprised of all of the reformed carbon from the host material that was consumed. Fullerenes are produced in addition to hydrocarbons, reformed graphite and carbon oxides. Soot production levels of a few grams per hour to hundreds have been achieved with efficiencies of 50% to <1%. In best case scenarios, amounts of approximately 2 grams of carbon-60 material per hour are produced in a plasma arc reactor (Anderson et al., "A plasma arc reactor for fullerene research"; Rev.Sci.Instrum, 65(12) :3820-3822, 1994).

Although the foregoing production techniques have allowed the scientific community greater access to the carbon molecules, a need for highly efficient methods with a reasonable production rate for economic manufacture of quality fullerene substances still remains. Thus, the full utilization of the originally identified carbon-60 structure (fullerene) and its sister molecules will not be economically feasible for large scale applications unless a suitable method of production evolves.

Accordingly, it is an object of the present invention to utilize an energetic non-thermal plasma discharge as a medium for fullerene (C-60) production.

It is yet another object of the present invention to utilize the Inertial Electrostatic Confinement (IEC) device for the non-thermal production of fullerene (C-60) and its sister molecules, and to take advantage of its strengths and uniqueness over other forms of production.

Also it is a further object of the present invention to provide a method suitable for efficient production of fullerene (C-60) and its sister molecules, potentially on a commercially viable scale, utilizing a relatively simple but efficient device and process.

SUMMARY OF THE INVENTION

A specific apparatus and method employing the IEC for fullerene production has been explored and involves the injection of a carbon-based gas with a buffer gas into an IEC operating in either a continuous or pulsed mode. During the pulse, a dense, energetic, non-thermal plasma is formed, disassociating the methane into carbon and hydrogen. The configuration of the IEC offers a very efficient way to form the desired plasma, which is non-Maxwellian in form such that the energetic ion component serves to effectively decompose the methane (or other carbon-containing gas feed). The potential field configuration in the core plasma region of the IEC is such that the higher Z carbon ions are preferentially concentrated in the core region of the plasma, while the hydrogen is moved towards the outer edge of the core. Due to the non-neutral character of the non-Maxwellian IEC plasma, a "double well" electronic potential profile is created in the core region of the plasma. This potential well phenomenon is described in the previously identified U.S. patent application Ser. No. 08/232,764, which is incorporated herein by reference. This natural separation of the carbon atoms from other species due to the potential field structure provides a highly efficient mechanism for recombination of carbon to form fullerene in relatively large quantities. At the end of the pulse, the plasma quickly cools leading to recombination of the various species. Fullerene (C-60) formation is favored in the central core region, where the combination of a high carbon ion and low hydrogen ion concentration favors carbon linking with a minimum probability of hydrogen interference via chain termination. The buffer gas, (e.g., helium, xenon, argon) does not directly participate in this process but is selected to serve as an energy storage/transfer component of the plasma. Thus, use of the buffer gas allows further optimization of the process.

The device for producing fullerenes includes an IEC vacuum chamber which has a central grid-like electrode and a conductive outer shell that are connected to a pulsed source of high voltage and provide an electric field within the chamber. The applied voltage supports the creation of a plasma at the inner core of the chamber near the electrode. A carbon-based gas, which is introduced into the chamber, possibly along with an inert buffer gas, is dissociated into component carbon and hydrogen ions that are separated and the carbon ions recombined into fullerenes that appear as a soot. The device includes a soot extraction mechanism for removing and collecting the fullerenes.

The device may include an intermediate guide grid that is operative to localize electron paths around the grid, thus enhancing the ionization's rate of the background neutral gas near the grid. Additional techniques and structures for implementing the IEC as a plasma jet device and for assembling a large scale production of fullerenes are suggested.

DESCRIPTION OF THE PREFERRED EMBODIMENT

The non-thermal plasma production of fullerene using the Inertial Electrostatic Confinement (IEC) device has been accomplished. In the preferred embodiment, methane with a helium buffer gas is injected into an IEC operating in a pulsed mode. During the pulse, a dense, energetic, non-thermal plasma core (non-Maxwellian) is formed, disassociating the methane into carbon and hydrogen. The potential field configuration in the IEC is such that the higher Z carbon ions are preferentially concentrated in the interior of the core region of the plasma, while the lighter hydrogen is moved towards the outer edge of the core. At the end of the pulse, the plasma quickly cools, leading to the recombination of the various species. Fullerene formation is favored in the central core region, where the combination of a high carbon ion and low hydrogen ion concentration favors carbon linking with a minimum probability of hydrogen interference via chain termination. The uniqueness and simplicity of the IEC device has the possibility for economic large scale production with relatively high fullerene formation efficiencies.

Figure 1A:
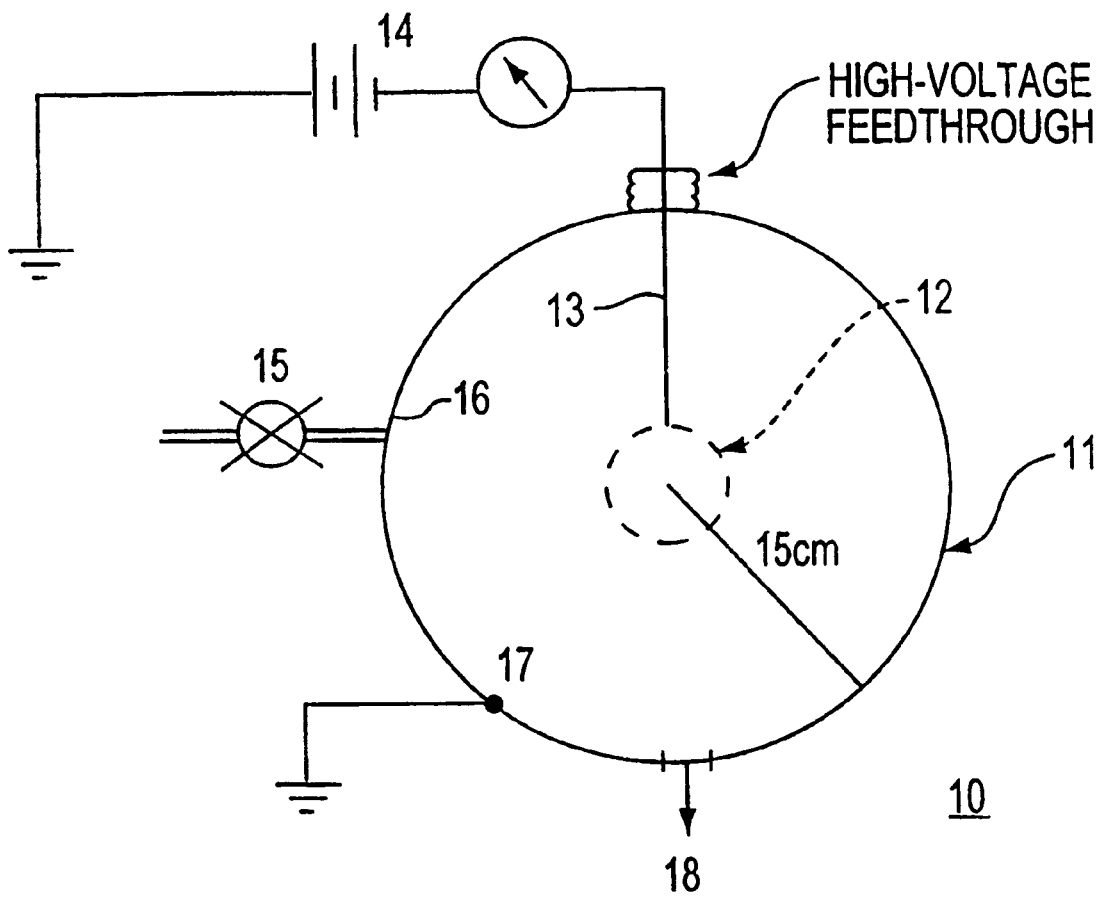
FIG. 1A is a schematic diagram of an inertial electrostatic confinement (IEC) neutron/proton generator.
Figure 5:
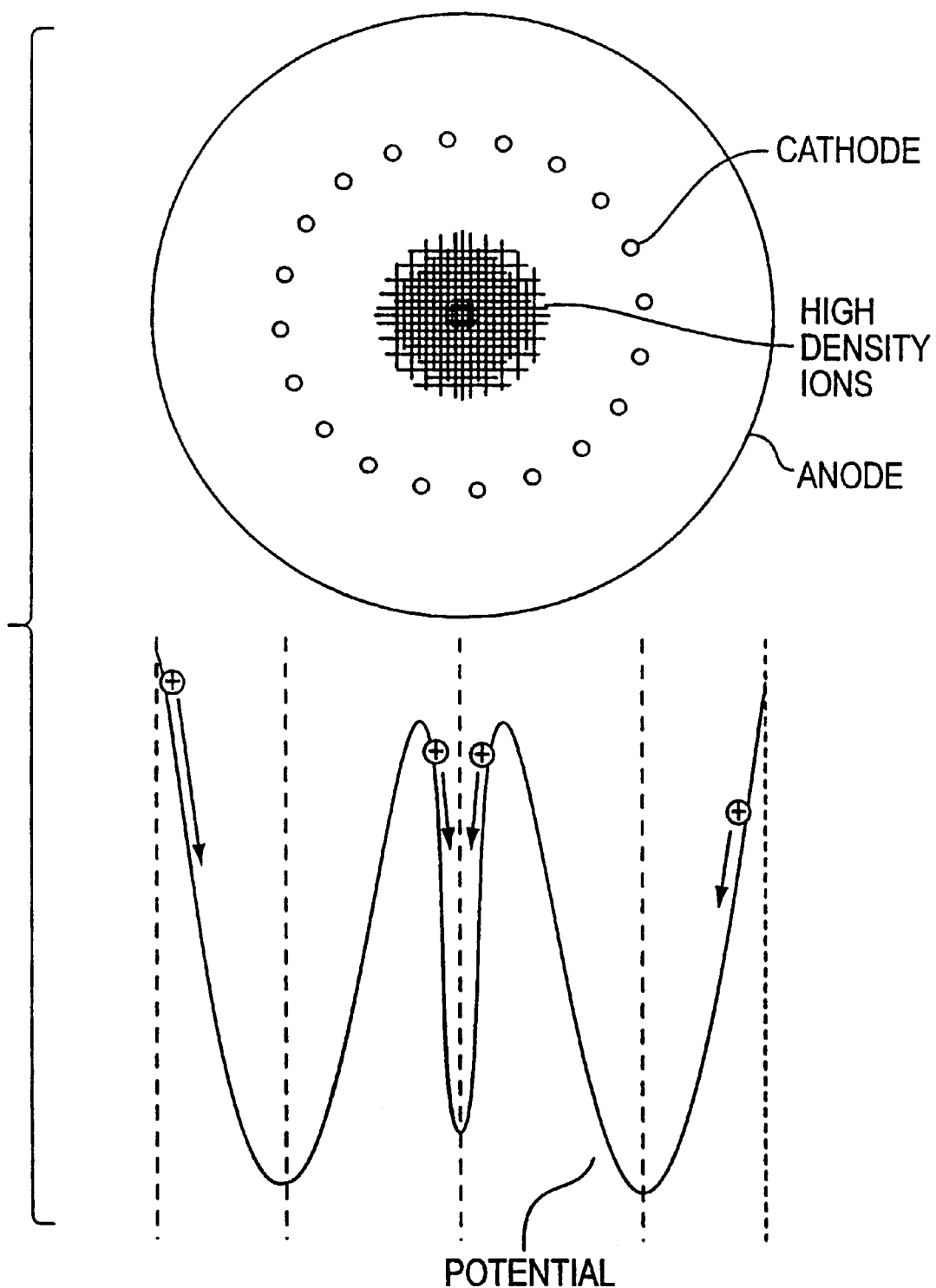
FIG. 5 is an illustration of a potential well structure and energetic non-thermal central core region of the IEC plasma that enhances the efficiency of fullerene production.

Originally developed as a neutron source for activation analysis, the inertial electrostatic confinement plasma source employs a spherical cage-like grid in a spherical vacuum vessel, as seen in FIG. 1A. When a gas is introduced into the chamber in the tens of mTorr pressure range, a plasma discharge is created by applying high voltage (10–70 kV) to the grid. The grid also serves to extract ions from the discharge and accelerate them toward the center of the device, where a dense, high-temperature core region is formed. As illustrated in FIG. 5, the potential surfaces created by the grid are shaped such that the ions are trapped and recirculated, creating a high non-thermal plasma with energetic (kV) ion and lower energy background electrons.

The potential surface at the grid will have depressions formed therein, due to the action of the geometry of the grid structure. This surface feature acts to focus the ions into micro-channels and assist the recirculation process. The resulting plasma provides several unique opportunities for plasma processing, either using in situ methods or employing radiation emitted from the dense core region.

Figure 1B:
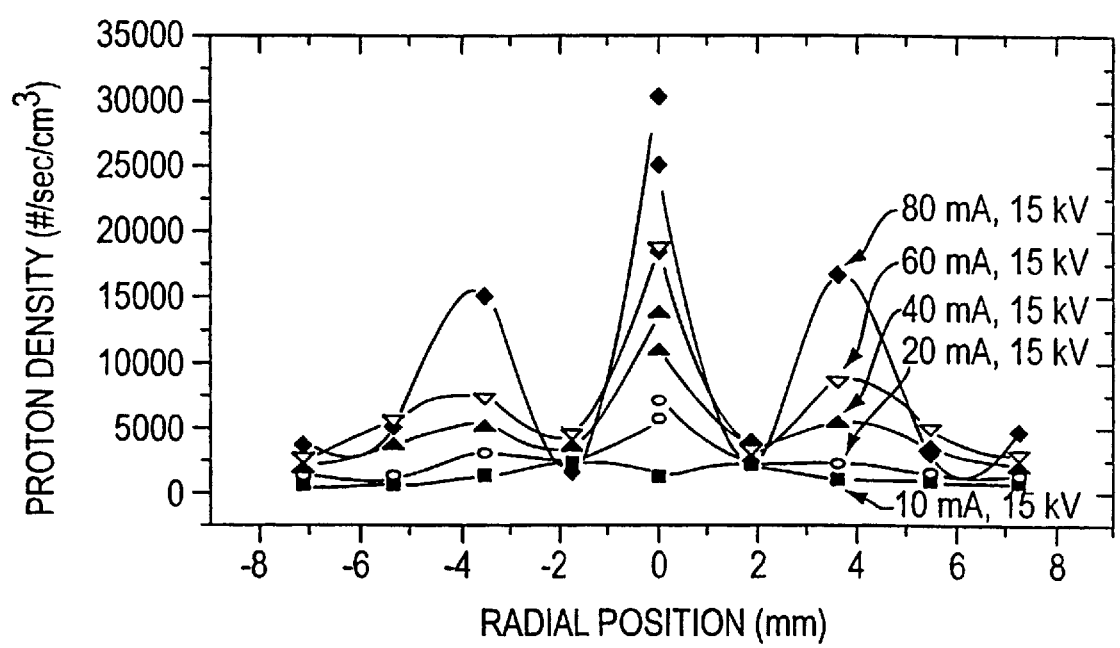
FIG. 1B shows potential structure relevant to the present invention.

The possibility of using the potential structure formed inside the cathode grid during IEC operation was realized as the result of extensive measurements and calculations of this structure in connection with use of the IEC as a fusion neutron source. If deuterium is used in the IEC, fusion of s the energetic D ions produces 2.5-MeV neutron and 3.4-MeV protons. Thus, diagnostic technique and data analysis method, based on spatial measurement of D-D proton emission, has been developed to evaluate the resulting radial proton source profile. The proton source rate is directly proportional to the D ion density squared, which in turn depends on the electrical potential profile ("structure"). Thus the proton measurement provides a non-intrusive exploration of the potential structure [Nadler et al., "Potential Profile Measurements Based on a Collimated Proton Detector in Spherical Electrostatic-Inertial Plasma Confinement (SEIC)," Ninth Topical Conference on High-Temperature Plasma Diagnostics, *Rev. Sci. Instrum.*, 63 (10) October 1992; Gu et al., "Potential Well Structure and Scaling Studies for the IEC," *Intl. Sherwood Fusion Theory Mtg.*, Madison, Wis., Apr. 27–30, 1997]. The proton source profile is measured by pivotally scanning through the core plasma of an IEC using a well-collimated proton detector with a several mm resolution. Then, using an Abel inversion method, the data from these scans are then inverted to obtain the radial proton source profile (i.e., proton birth rate vs. radius). This experimental technique has confirmed the existence of a strong potential structure when a perverance threshold condition for structure formation of 2.2 mA/kV$^{3/2}$ is exceeded. Measurements shown in FIG. 1B plot the D-D proton source rate per unit volume vs radius from the center of an experimental IEC device for various grid currents at 15 kV. [Gu et al., "Potential Well Structure and Scaling Studies for the IEC," *Intl. Sherwood Fusion Theory Mtg.*, Madison, Wis., Apr. 27–30, 1997)

The appearance of a three-peak profile is a definitive signature that a potential well "trap" for positive ions has formed in the center of the core. The results in FIG. 1B show a consistent increase in the amplitude of the virtual electrodes that create this trap with increasing current. This observed evolution of the proton/potential profiles fit well with Vlasov-Poisson theory for spherical IEC plasma confinement. In such a case, if a gas mixture was used in the IEC to create ions with different charge-to-mass ratios, each ion will be concentrated in different radial zones due to the potential variation within the trap.

Figure 1C:
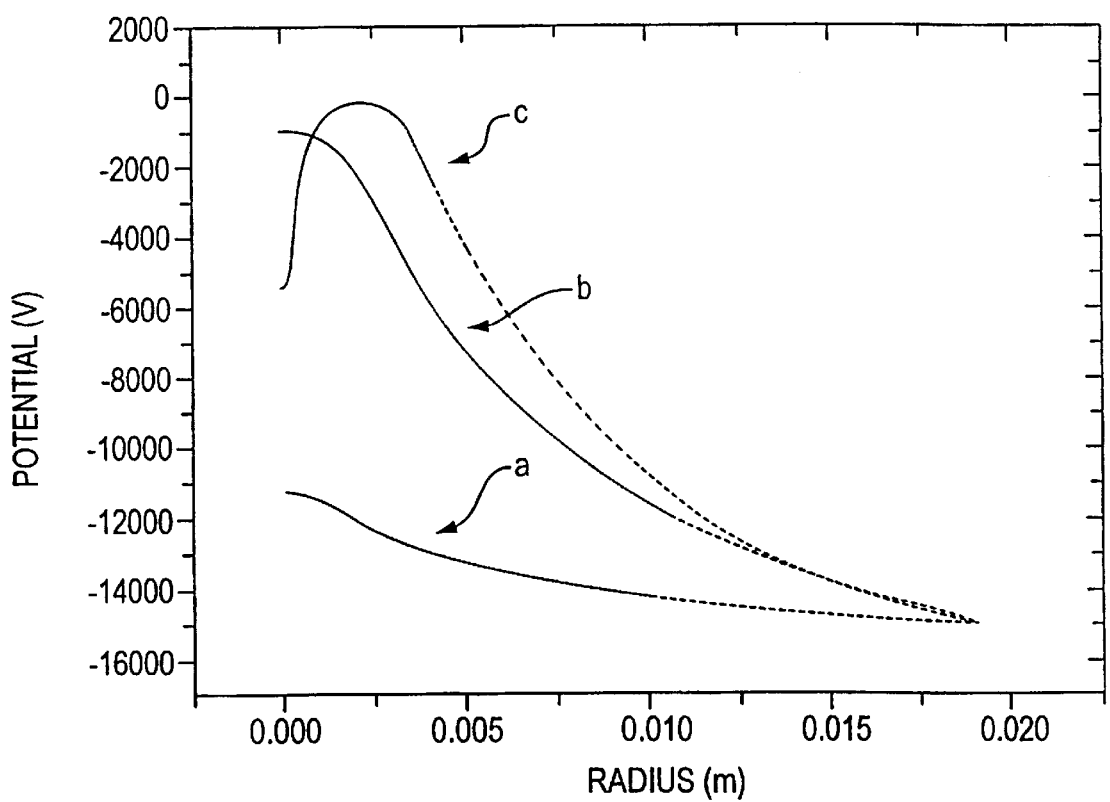
FIG. 1C shows another potential structure relevant to the present invention.
Figure 1D:
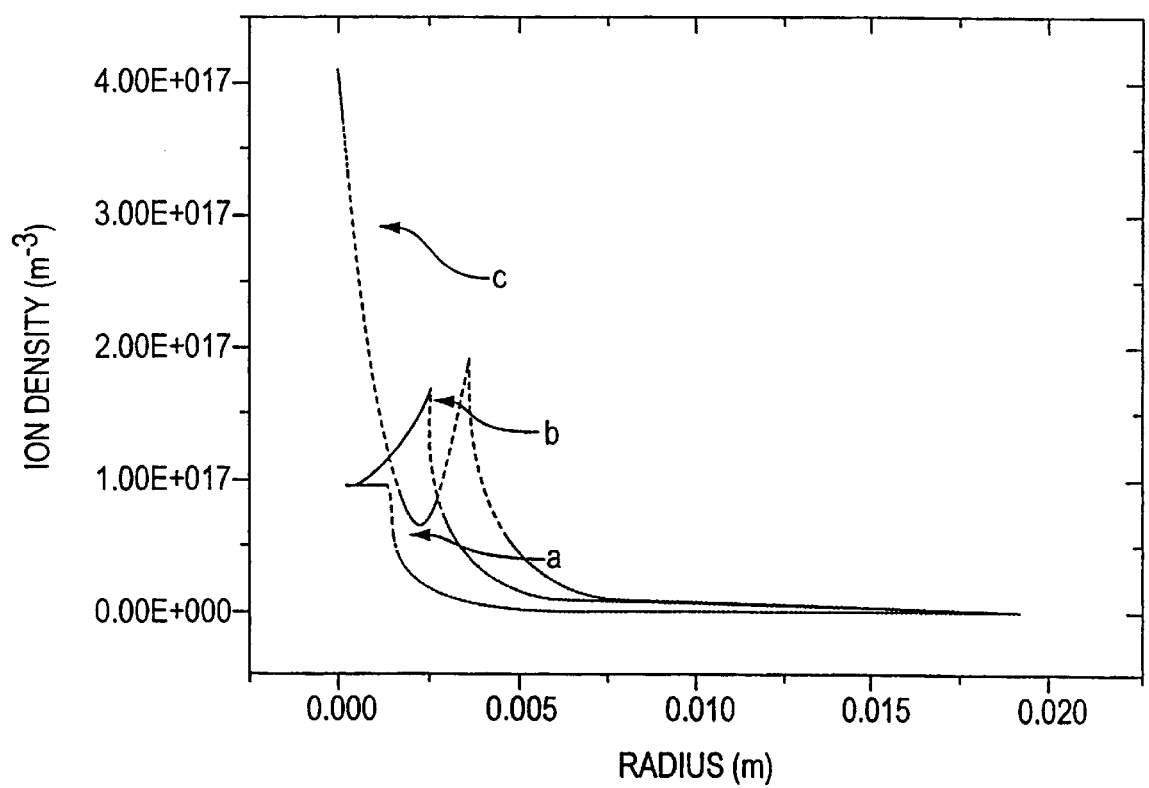
FIG. 1D shows an ion density profile relevant to the present invention.

Added insight into this potential structure has also been obtained from computer simulations of the IEC plasma. First, to verify the calculational technique, the ion density profile and potential structure have been calculated for conditions similar to those used for the proton measurements, and the evolving potential structure and ion density profile are presented in FIG. 1C and 1D, respectively, at 15 kV. [Tzonev, I. V., "Effect of Large Ion Angular Momentum Spread and High Current on Inertial Electrostatic Confinement Potential Structures," M.S. Thesis, Department of Nuclear Engineering, UIUC, Urbana, Ill., May 1996] At fixed voltage, the potential structure is seen to evolve from a single potential well at low current to a double-potential well at high current. These results show good agreement between the spatial proton measurement of D-D proton emission in FIG. 1B, providing confidence in the calculations Such simulations have been extended to higher voltage—current conditions such as would be used in the present invention.

Parametric studies with the IXL™ Vlasov-Poisson solver code (King and Bussard, "A Dynamic Poisson-Solver for Spherically Convergent Inertial Electrostatic Confinement Systems," *Energy-Matter Conversion Corporation Report*, EMC2, pp. 1191–03, EMC2, Manassas, Va., 1991] have shown that under high ion currents, with spreads in the angular momentum of the injected ions, even deeper double-potential wells will form. In addition, dynamic particle-in-cell codes such as PDS1™ [Bromley et al., "PIC-MCC Simulations of the IEC Fusion Device," *Bult. APS*, 40, 11, p. 1736, 1995; Bromley et al., "PDSI™ Simulations of IEC Fusion Devices," Abstracts: 1995 IEEE International Conference on Plasma Science, IEEE Conf. Rec. 95CH35796, p. 206, Madison, Wis., Jun. 5–8, 1995] and Ohnishi's PIC code (OPICC) [Ohnishi et al., "Multi-Potential Well Formation and Neutron Production in Inertial-Electrostatic Confinement Fusion by Numerical Simulations," *Proceedings of Symposium on Fusion Engineering*, Vol. 2, Sep. 30–Oct. 5, 1995] have shown the formation of multiple potential well structures, of the type desired for the present invention.

In summary, a series of experiments and computations by various workers have confirmed the existence of a potential structure in the central plasma core region of the IEC during operation which exceeds certain current and voltage conditions. The present invention utilizes these observations, but extends them by the new concept of using this structure for partial separation and concentration of different ion species in different radial zones within the potential structure.

The IEC structure and mechanism offer a basis for an efficient production mechanism essential for the mass generation of fullerene for commercial and industrial uses. The IEC device, as illustrated in FIG. 2, uses its potential well structure and the isolation of carbon ions to provide for efficient fullerene production.

Figure 2:
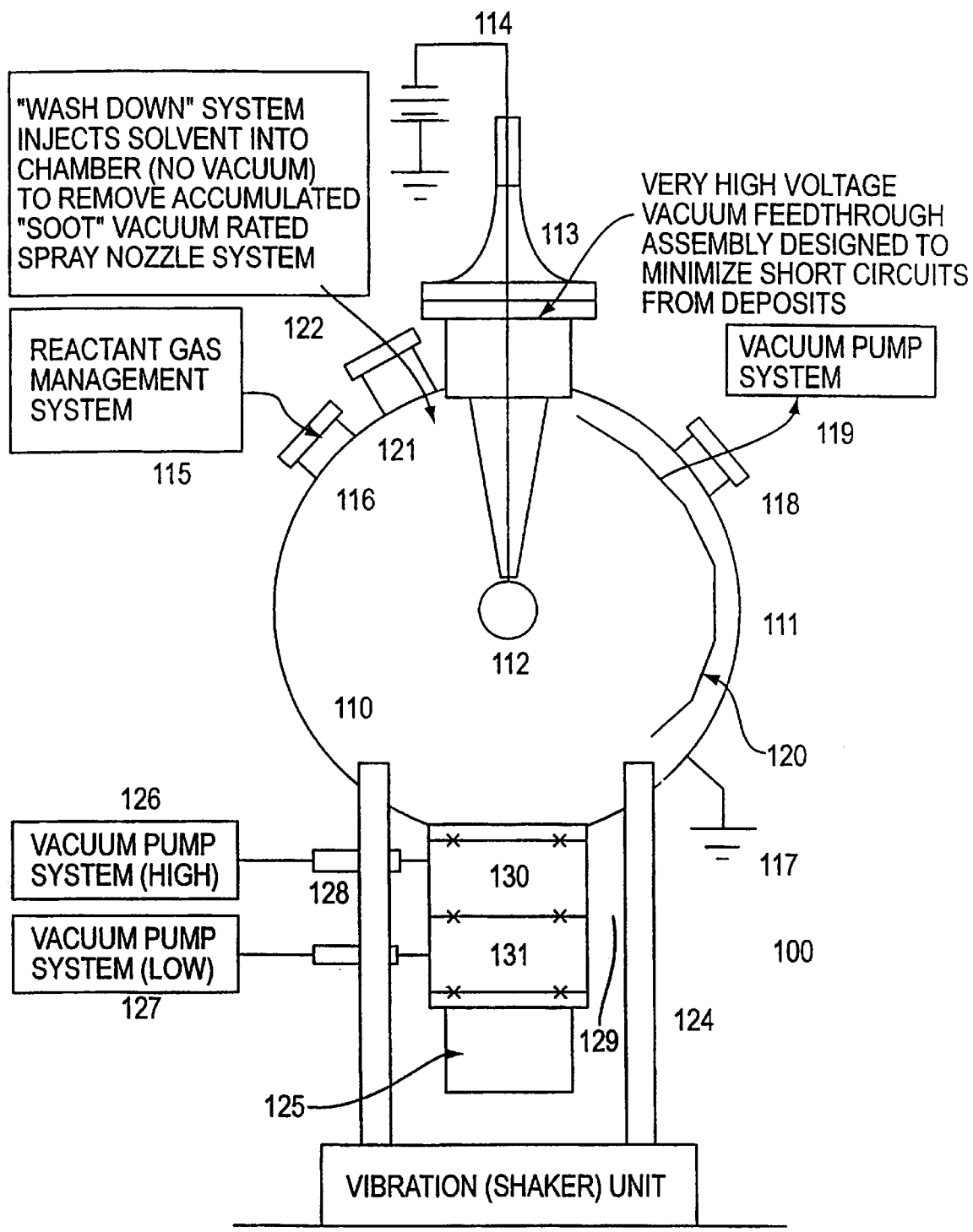
FIG. 2 is a schematic design for a fullerene generator apparatus using an inertial electrostatic confinement (IEC) device, which is the subject of the present invention.

As seen in the FIG. 2, the IEC fullerene production unit 100 comprises an IEC spherical structure 110 comprising a spherical conductive vacuum container 111 having attached thereto a grounded terminal 117. Within the container 111 is a central electrode assembly 112 in the form of a cage-like grid. If required, in a preferred embodiment, the electrode can utilize active coolant that flows within hollow pipes that constitute the grid, for achieving an optimum input power level that provides the desired potential without damage to the grid-like electrode structure. The potential difference is achieved by connecting a power supply 114 to the central electrode 112 through a very high voltage vacuum feedthrough assembly 113 that penetrates the shell of the container 111 while preserving the vacuum condition within the shell. The power supply is switched to provide a pulsed output voltage or pulsed current to the central electrode. The shell also has a vacuum port 118 that is connected between a vacuum pump 119 and a gas extraction manifold 120. The vacuum pump serves to maintain a proper vacuum level within the container 111 and to facilitate the collection of gases that are accumulated at the inner shell by extraction manifold 120. The shell of container 111 has a second port 116 to which a reactant gas management system 115 is attached. Typically, a mixture of a carbon-based gas, such as methane, and a carrier or "buffer" gas, such as helium, is provided through port 116. The shell of container 111 has a third port 121 to which a "wash down" system is connected, such system including a vacuum rated spray nozzle system.

The wash down system nozzle is operative to inject solvent into the chamber under a "no vacuum" condition so that the accumulated fullerene "soot" can be directed to a collection area 129 and removed through the product collector container 125.

As seen in FIG. 2, the spherical container 111 is supported at its lower hemisphere by semi-rigid legs 124, which are connected to a vibration-producing shaker unit 123. Upon actuation of the shaker, and in coordination with the operation of the wash down system, fullerene-containing soot within the chamber is directed to a lower collection area 129, which contains a removable reactor product collector container 125 for the wash down soot and solvent. A vacuum pump system having a load-lock design with high (126) and low (127) vacuum ports for different load-lock chambers and being connected to the collection area by flexible connectors 128 can serve to gather fullerene-containing soot on a periodic basis.

The practical issues, mechanisms, and operating parameters for the operation of an inertial electrostatic confinement (IEC) device are addressed in this description of a process cycle, starting from the input of methane into the system, to the removal of the fullerenes ($C_{60}$) at the end of the cycle.

Figure 3:
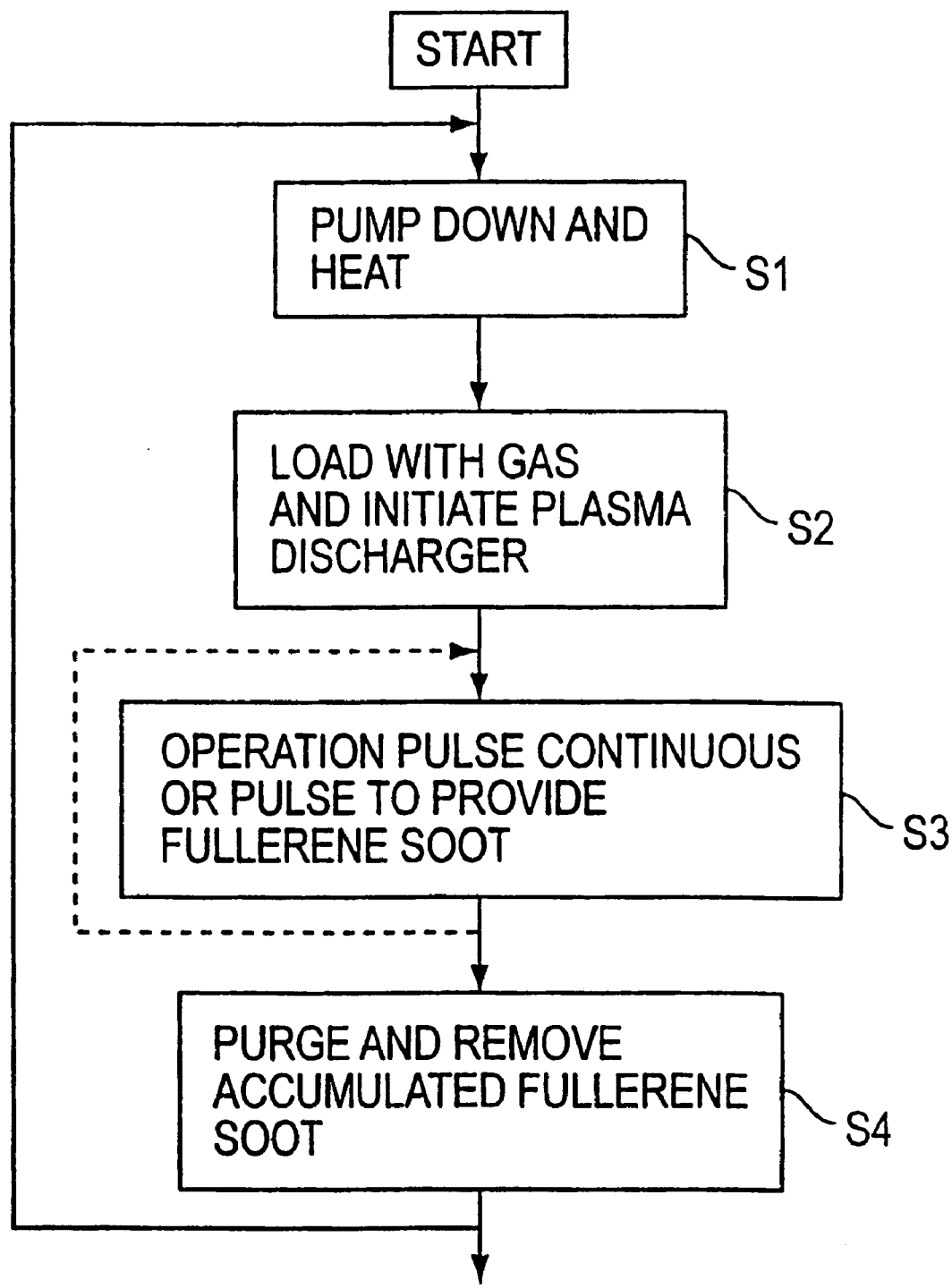
FIG. 3 is an illustration of the process flow chart defining the steps in the method of production of fullerene using the IEC device.

In an initial preparation mode, as seen in FIG. 3, the IEC unit is pumped down and heated to bake out contaminants that may have accumulated from a prior process cycle. Specifically, in step S-1, the IEC reaction chamber 111 is evacuated by vacuum pump system 119, which may be a turbo molecular ultra high vacuum pump, via port 118 to approximately $10^{-5}$ to $10^{-6}$ Torr and heated to 400 degrees C. for one hour to eliminate possible contaminants. The vacuum pump exhaust may be diverted for gas solvent recovery.

In a loading step S-2, the pump 119 is isolated and set for higher pressure pumping, the pump exhaust diverted to recover reactant and buffer gas mix, and methane, or another hydrocarbon gas, typically with an additional buffer gas such as helium, is introduced into the chamber 111 from a reactant gas management system 115 via port 116 and the pressure is then maintained at approximately $2\times10^{-3}$ Torr, by means of a valve and/or mass flow controller within the gas management system 115. The reactant gas preferably is a combination of methane and helium in a proportion that can cover a wide range, varying from no buffer gas to approximately equal portions of the methane and helium. An electrical (plasma) discharge is initiated by Paschen breakdown of the hydrocarbon gas by supplying voltage at approximately 10 kV from power source 114 to the IEC cathode grid 112 at the center of the chamber. This voltage pulse having a high voltage potential is applied to the central electrode 112 from high power source 114 via the vacuum feed-through assembly 113.

In a production mode step S-3, once the resultant plasma glow discharge is established, it is sustained by maintaining the grid voltage at approximately 10–60 kilovolts (kV) and the current at approximately 5–100 milliamperes (mA), by small adjustments of the power and gas supplied to the system. The operation of the cycle can be either quasi-steady state (e.g., extended maintenance of voltage and current), or short pulsed (e.g., rapid periodic pulsing of the grid voltage with a resultant periodic discharge). The cycle can be repeated until fullerene soot accumulation forces a purge.

The electrical discharge in the hydrocarbon gas dissociates the molecules and ionizes their component atoms. The electrical potential difference between the wall of the chamber 111 and the grid 112 accelerates the ionized atoms to the center of the chamber. The potential well structure generated by these converging ions, confines many ions in the center (core) region of the chamber. Due to the charge-to-mass ratio of the hydrogen ion relative to the carbon ion, the hydrogen is confined within a large core volume and the carbon ions are held within a smaller region, thus forming a localized high density region of nearly all carbon ions. This ability to separate species is in sharp contrast to the situation in "normal" electrical discharge plasmas. Attempts to use the latter case for fullerene production have encountered a significant reduction in efficiency since the strong pressure of hydrogen causes it to become involved in the carbon chain, frequently stopping the reaction prior to $C^{60}$ formation. The carbon particles, held close to one another in the center of the grid, recombine to make $C_{60}$, $C_{70}$, and other fullerene molecules. These fullerenes are relatively heavy, and tend to settle out of the discharge, especially to the bottom of the chamber. As the process continues, due to the potential field configuration in the IEC, the carbon ions are extracted by the grid, accelerated toward the center of the device and then recirculated, resulting in the formation of a dense, high temperature core region plasma about the grid. The shape of the grid and the potential applied thereto would serve to extract carbon and hydrogen ions from the discharge. The higher Z carbon ions are preferentially concentrated at the interior core region of the plasma. The lighter hydrogen ions are moved towards the outer edge of the core, toward the hydrogen manifold 120, from which they are removed by the vacuum pump system 119 via port 118.

When the pulse ends and the plasma cools, fullerene formation occurs in the central core region where there is a high carbon ion concentration and low hydrogen ion concentration, favoring carbon linking and, thus, the formation of the complex carbon fullerenes. The fullerenes appear as a "soot" that is condensed on the interior sides of the chamber 111 or at the bottom of the chamber. As detailed subsequently, the soot is removed after the pulse cycle and cooling of the IEC, using either or both the shaking unit 123 and the wash down system. The wash down system will spray a solvent onto the inner walls of the chamber and its components, causing the soot to be collected in the collector container 125.

In a final purge mode step S-4, the reactant gas mixture is shut off and switched to helium. The removal of fullerenes from the chamber is accomplished with an air-lock/load lock system 129. The load lock is a device that allows passage of material out of the chamber without allowing the pressure in the chamber to rise or fall significantly. The chamber is shown in FIG. 2 to be spherical with a cylindrical-shaped load lock system, but an alternative structure for the IEC chamber would include a conical bottom, which would act as a funnel to channel the fullerenes toward the load lock, located at the bottom of the chamber/funnel. The electrical configuration of the IEC chamber is normally spherical, and a hemispherical shaped wire mesh can be used to maintain the electrical geometry of the bottom of the chamber, while the solid conical walls of the bottom of the chamber would maintain the pressure in the chamber as well as channel the fullerenes to the load lock.

In the purge mode, the pressure in the chamber is raised to support a wash down and the wash down spray unit 122 is operated to force the accumulated fullerenes to the bottom of the chamber. Of course, the apparatus may be implemented without a wash down unit. In any event, at specific time intervals, the inner door 130 of the load lock is opened, allowing the fullerenes (and wash down solution if used) to drop by gravity into a lower chamber (maintained at the same high pressure as the reaction chamber). The inner load lock door 130 is then closed, the pressure in the lower chamber raised, and the second door 131 of the load lock is opened, allowing the fullerenes to drop further into a container. The second load lock door 131 is then closed, and the lowest load lock 132 is opened so that the fullerenes fall into lower removable chamber 125. When the lowest load lock door is opened, the lowest chamber is at atmospheric pressure for removal or further processing of the fullerenes. To encourage the fullerenes to drop to the bottom of the reaction and load lock chambers, a vibrator 123 can be attached to the bottom or sides of the chamber to shake the fullerenes loose from the sides, and allow them to drop freely by gravity to the bottom of the chamber.

Figure 4A:
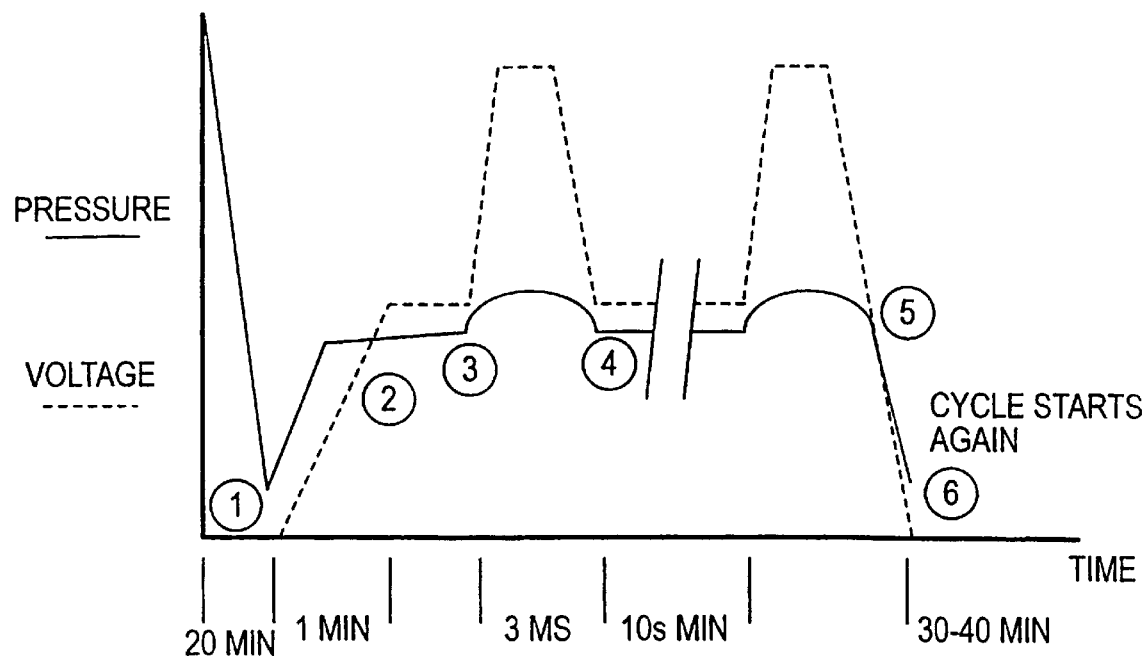
FIGS. 4A and 4B are illustrations of the time sequence of pressures and voltages that may be used during the production of fullerenes using the IEC device.
Figure 4B:
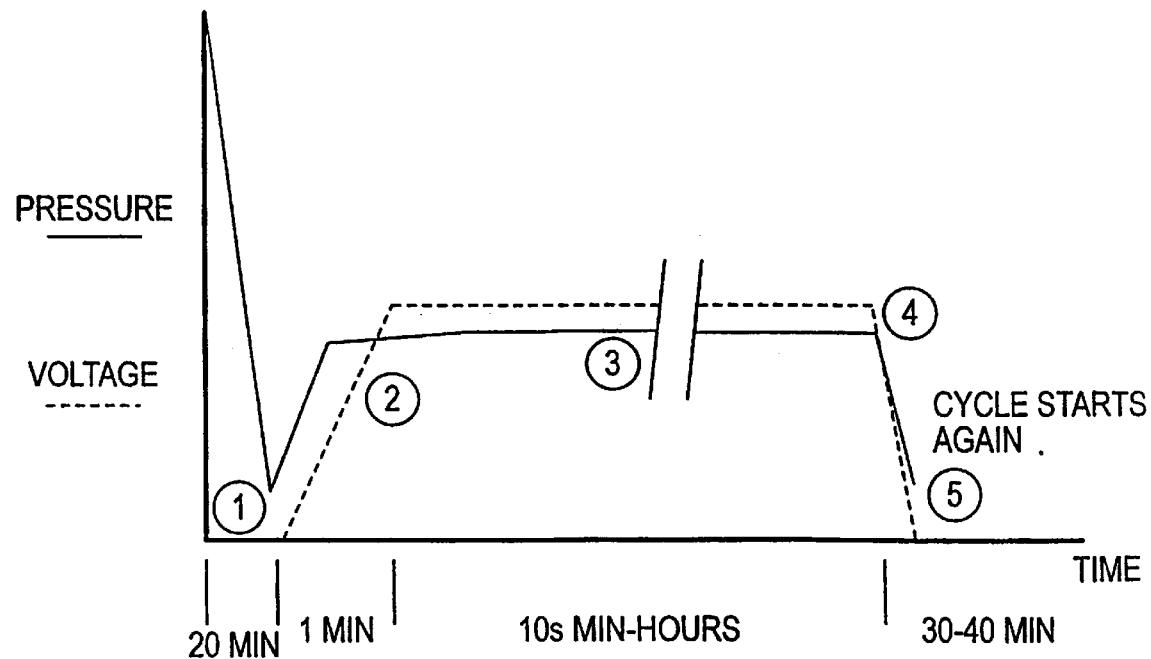

The timing of the pressures and voltages are seen in FIG. 4. which shows the time scale and pressure and voltage trends at various points in the IEC based production of fullerenes for both pulsed (a) and steady state (b) production modes. For the pulsed mode production of fullerenes, the sequence and timing are (1) pump down of the system from atmosphere (approx. 20 min.), (2) introduction of gas into the vacuum chamber, initiation of the plasma discharge (1 min.), (3) application of a voltage pulse to generate fullerenes (3 ms), (4) repetition of pulses (10's of mins.), (5) termination of pulsing, (6) extraction of fullerenes, pump down of chamber, restart of processing cycle (30–40 min.). For steady state production of fullerenes, the sequence and timing are: (1) pump down of the system from atmosphere (20 min.), (2) introduction of gas into the vacuum chamber, initiation of the plasma discharge (1 min.), (3) steady state operation of the discharge (10's of mins. to hours), at the optimum pressure, voltage and current, (4) termination of operation, and (5) extraction of fullerenes, pump down of chamber, restart processing cycle (30–40 min.).

FIG. 5 shows the double electrostatic potential well which develops in the IEC, and the relationship of that well to the physical components of the IEC and to the ions. The ion flow from the plasma discharge region to the cathode results in a potential well inside the cathode. With sufficient ions, the collective space charge of the ions inside the cathode forms a virtual anode which will attract electrons. The electrons will themselves form a virtual cathode—a deep negative electrical potential well in which the positive ions are trapped. The trapping of the ions in the second well occurs in a very small volume compared to the cathode volume, causing a high density plasma core to be formed and high fusion rates to be achieved. The potential well concept may be applied to a single grid spherical IEC device. In any event, the formation of a deep and stable double potential well is considered essential for good ion confinement. The well depth can be maximized by several well known techniques. The potential well formation can also be achieved with reverse polarity, i.e., with a positive applied potential on the cathode. In this case, electrons streaming to the center of the device initiate the process of well formation. This configuration also can be used for fullerene production.

The use of an IEC as a jet thruster device, as disclosed in Provisional Patent Application Ser. No. 60/030,009 (filed Nov. 1, 1996) for "Ion Jet Thruster Using Inertial Electrostatic Confinement Discharge Plasma", and PCT Application No. PCT/US97/19306; filed on Oct. 31, 1997 and entitled "Plasma Jet Source Using an Inertial Electrostatic Confinement Discharge Plasma", which are incorporated herein by reference, may be adapted so that the expelled jet or rocket exhaust from the IEC chamber is rich in fullerene species. The advantage of this concept is that the produced fullerene particles or soot are transported out of the IEC chamber with an intrinsic high efficiency that is associated with a rocket motor.

Figure 6A:
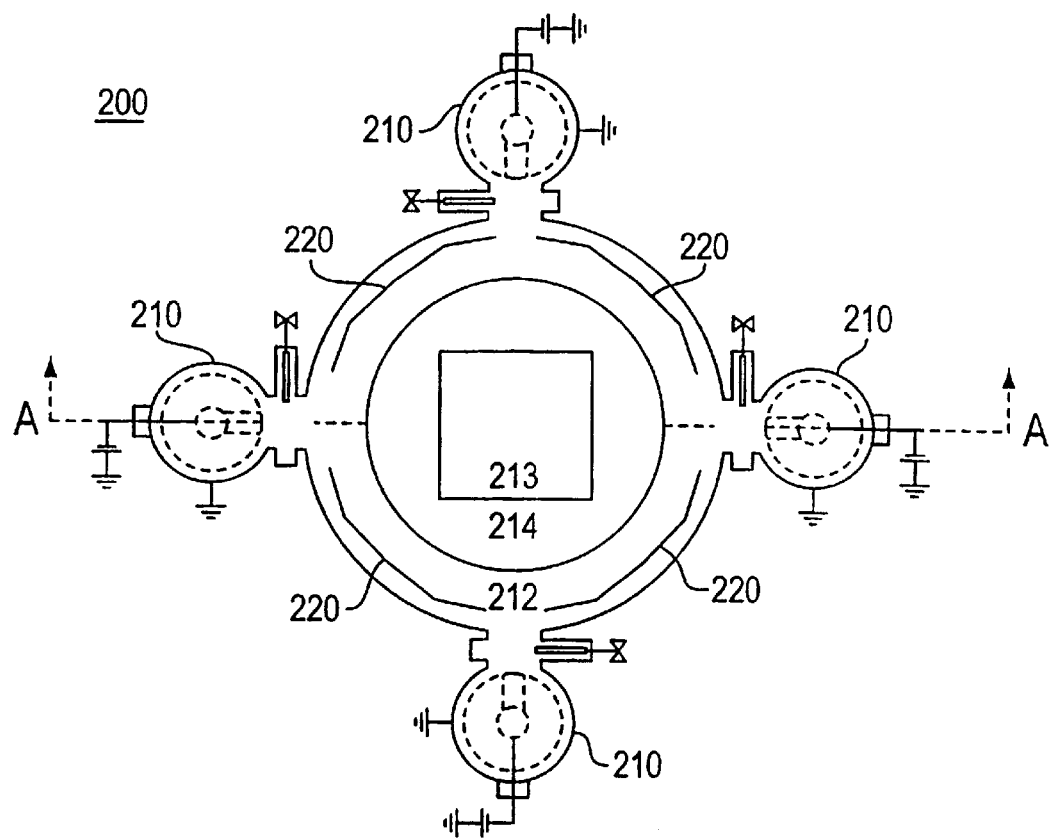
FIGS. 6A and 6B are illustrations from two perspectives of an industrial fullerene production facility based on a cluster of IEC jet devices with jets directed to a central "soot" collection system, FIG. 6B being a cross-section of FIG. 6A.

FIG. 6A shows a preferred embodiment of a fullerene production system which. utilizes a set of 4 IEC jet reactor chambers 210. Each IEC chamber 210 is operated within or attached to a much greater volume vacuum chamber 212 into which the rocket exhaust jets can expand and cool. The IEC chamber attachment includes an insulator section 219 in the middle of which is a hole for the jet. The jet emerging from the IEC chamber 210 consists of positive charged ions and negative charge electrons. An array of electron emitters 218 at the IIEC chamber jet exit orifice is utilized to provide electrical charge balance to the jet. The fullerene particles will fall to the lowest point as they are decelerated by collision with a baffle or deflector structure 213. The large secondary vacuum chamber pressure will be maintained at a low pressure to ensure a negative pressure with respect to the IEC reaction chamber. The pulsed mode of operation of the IEC reactor will be optimized to attain a highest rate of fullerene formation while supporting the expulsion of the fullerene particles via the plasma jet.

A further means of jet particle deceleration may be employed. The use of a hollow electrode at ground potential 240 and another hollow electrode 241 which is coaxially located further downstream of each jet and set at a high positive potential in the order of 10 to 30 kV can establish an electrostatic potential field that will decelerate any remaining positively charged particles. This should only be in one location on FIGS. 6A and 6B.

The removal of the fullerene "soot" can be implemented without a disruption of the IEC reactor process or at least there can be an optimization of the fullerene production process steps in order to increase productivity to a level of tens of kilograms per hour or more. The removal system consists of the baffle structure 213, a "soot" collector funnel 214 which is mounted on a shaker actuator system 215. An "air lock" or "load lock" system 230, 231, 228, 226, 227 is employed for "soot" removal without disruption of the vacuum within the system, thereby permitting continuous fullerene production operations. When "soot" accumulation reaches a level no longer tolerated, a "wash down" system 217 mode of operation may be employed.

Figure 6B:
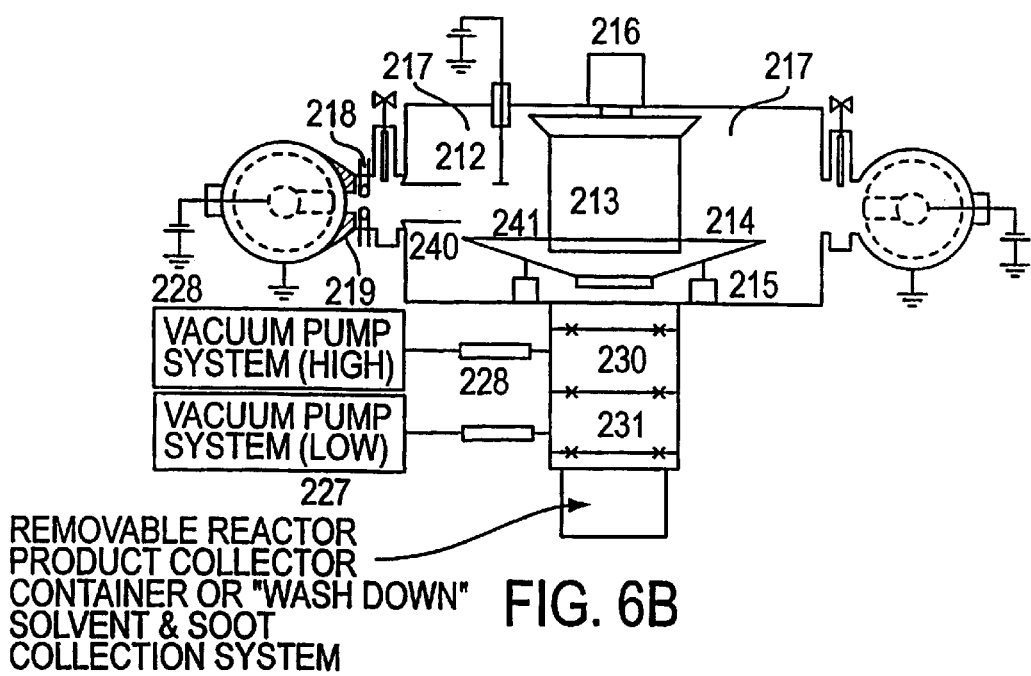

Scaling up of the production system could utilize several IEC reactors connected to one central large vacuum tank soot collector and extraction system as illustrated in FIGS. 6A and 6B. The production facility could achieve higher productivity and be more robust as an industrial facility.

The jet thruster version of the IEC may be based on the same vacuum vessel and single grid configuration described earlier, but in an alternative embodiment, one of the grid openings is enlarged to perturb the local electric field so as to create a plasma jet following from within the grid outward. When an opening in the vessel wall is aligned with the enlarged grid opening, it is then possible to bring the jet out of the vessel, provided the external pressure is less than or equal to that inside the vessel, preventing backflow of gas into the vacuum vessel. This is the natural condition when the thruster is used in space, otherwise the vessel opening must be directed into another vacuum vesse for purposes of pressure control. Another change in the unit is that electron emitters are added near the vacuum vessel opening to neutralize any space-charge build-up due to preferential electron escape through the jet. Also, to enhance and direct the jet flow, a short cylindrical grid, biased at the same potential as the cathode grid, is inserted with its axis aligned with the centers of the cathode grid and vessel openings. This grid then provides a potential "trough" to aid the jet flow out of the cathode grid and through the vessel opening.

While the single grid IEC can be used for plasma jet operation, the reference patent also discloses an alternate configuration where a second grid is added between the vessel wall and the cathode grid. Electron emitters are added at various locations around the vessel wall. The added grid is then maintained at a low positive voltage such that is serves to attract and guide electrons from the emitters such that they follow a path along the surface of this "guide" grid. This serves to help localize the birth point for ions created by electron impact collisions with neutrals to a volume around the guide grid. This localization of the ion source increases the efficiency for potential structure formation and jet operation since all ions are accelerated to approximately the same energy by the cathode grid, their distance from the cathode being roughly equal to the separation distance of the guide grid and the cathode grid. In this case, an appropriate hole in the second grid is provided to accommodate the cylindrical grid used to guide the plasma jet. Since all four structures (the cathode grid, the second grid, the cylindrical jet guide grid, and the conducting vessel wall) are held at different potentials, appropriate electrical insulator structure is provided to stand off the voltages during operation.

Figure 7:
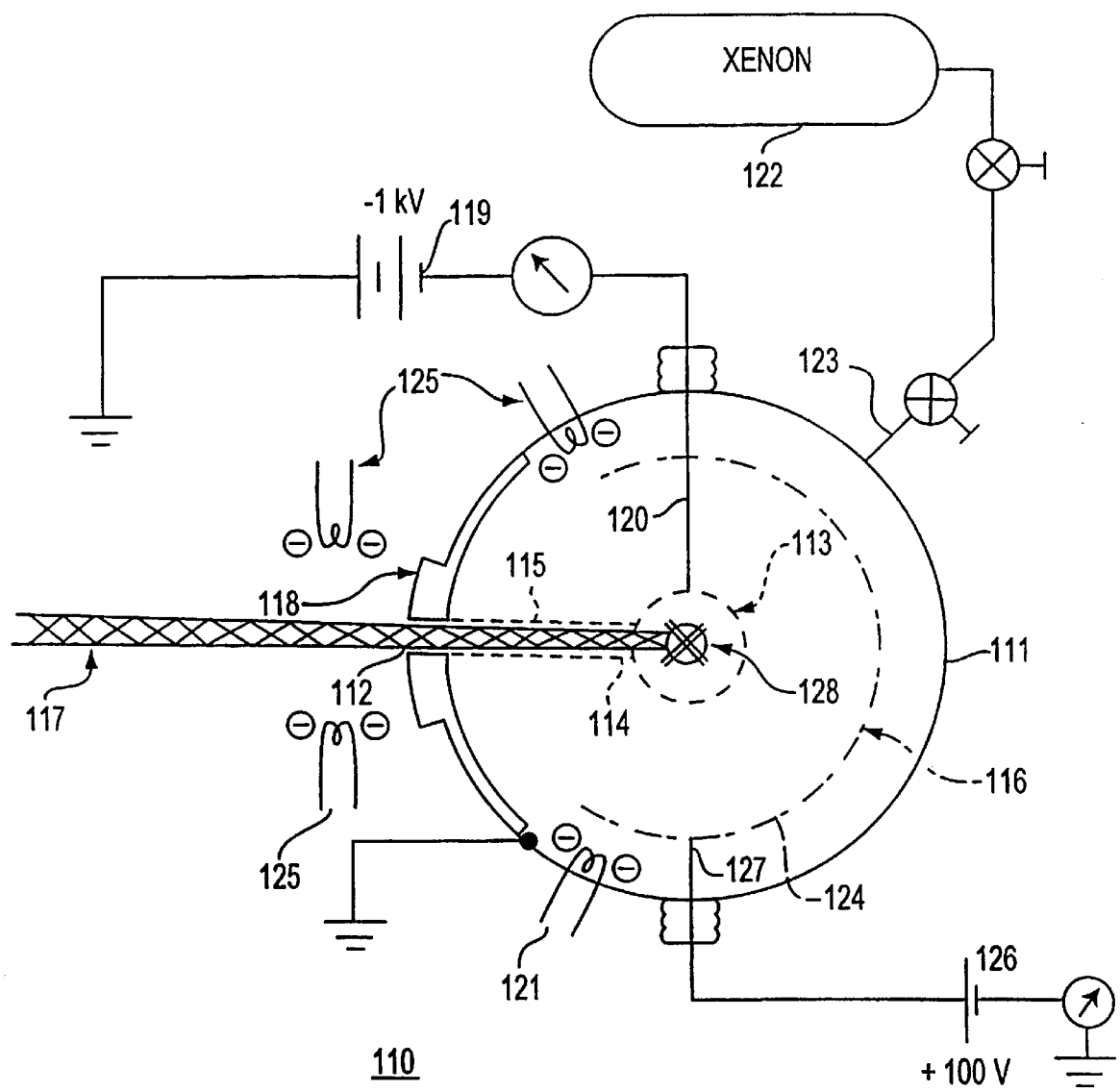
FIG. 7 is a schematic design for an IEC jet source, which is the subject of the present invention.
Figure 8:
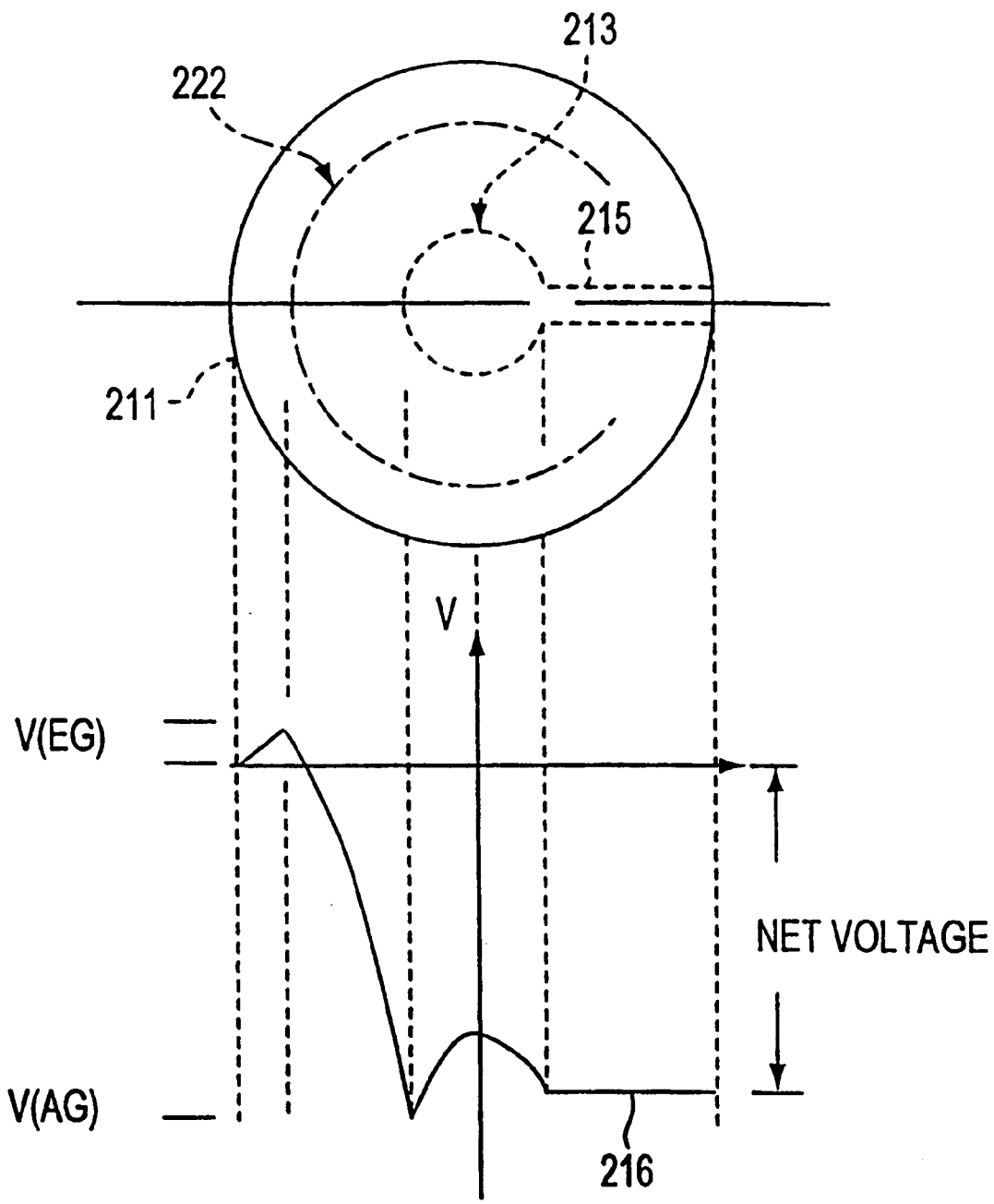
FIG. 8 is an illustration of the electrical potential along a thrust axis of the IEC jet source.

The design of an IEC jet source is shown in FIG. 7. The source 110 is comprised of a spherical vacuum chamber 111 with a small hole 112 formed in one side. A small diameter spherical electrical wire grid 113, which may be made of tungsten or tantalum, has a geometric transparency of greater than 90%, is mounted inside the chamber. The grid also may be formed of a plurality of vanes joined together in a geometric pattern which provides a thin profile when viewed in a radial direction in order to achieve a high geometric transparency. The grid serves to define a central volume that confines a plasma, formed of generated ions, and provides an ion stream that becomes the plasma jet. A second hole 114, approximately the same size as the first hole, is formed in the side of the wire grid 113. This hole 114 is aligned with the hole 112 in the chamber wall and is connected to it by a cylindrical grid 115 having a diameter similar to that of the two holes. The cylindrical grid 115 creates a channel in the electrostatic potential distribution, through which ions can escape at their maximum kinetic energy in a jet 117. The electrostatic potential variation is shown in FIG. 8. An insulator 118 covers the grounded wall of the chamber 111 and must be sized to prevent arc-over from the grounded vessel wall to the cylindrical grid 115. As seen in the figure, this is a high voltage insulator which has a spherical shape and which covers the outer ground wall in the region near the hole through which the plasma jet exits the device. The high-voltage insulator also lines the inside of the hole 112 through which the plasma jet passes. The insulator maintains the electric potential difference between the negatively biased cylindrical grid cathode and the both the outer ground sphere, and the electron guide grid. The device also uses insulated support structures to hold the electron guide grid, spherical cathode, and cylindrical grids in place. Inner electrical grids 113 are connected to a power supply 119 through an insulated feed through cable 120. The cable and connectors (unnumbered) comprise a high-voltage feed-through insulator systems which allows electrical power at a high negative voltage to be sent to the inner cathode 113, and electrical power at a low positive voltage to be sent to the electron guide grid 116. A positively charged outer electrical grid 116 that is connected to a power supply 126 (for example, 10–1000 V) and is positioned to be concentric with and near the grounded sphere 111, in combination with electron emitters 121 will generate ions. The intermediate spherical grid-like structure 116 that lies between the inner cathode and the outer ground sphere, is highly transparent to ion and electron flow and is biased to a voltage positive relative to the ground sphere potential. This structure is an electron guide grid which effectively increases the path length of electrons and enhances the ionization rate of the background neutral gas into plasma. As seen in FIG. 3, the sphere of the electron guide grid does not extend over the entire device. A section of the electron guide grid is cut out near the plasma jet hole through which the plasma jet escapes the device. The voltage on the outer grid 116 must be selected to optimize ion generation, and may be in a range of −0.1 kV to −30 kV, and may operate with an electrical current of 0.005 to 2,000 amps. The accelerating voltage must be kept at a level .(e.g., 1 kV) to ensure that the resultant exhaust velocity will be close to a desired level (e.g., 30,000 m/s, where ISP is less than 3,000 seconds). A gaseous propellant 122, which may be xenon or other comparable material, is bled into the chamber through holes 123 at appropriate locations around the wall of the vessel 111. The neutral gaseous propellant between 0.1 and 20 m Ton. The entire gas-feed and ionization system will be optimized to minimize the loss of neutral propellant during operation. Additional electron emitters 125 are attached close to the jet discharge hole 114 to ensure complete neutralization. These emitters are situated on the inside of the device, attached to the outer ground sphere, with the emitter coils/guns positioned in the space between the wall of the outer sphere and the electron guide grid 116.

As seen in FIG. 7, a central core 128 is the location of highest concentration of the ions and acts as the source for the plasma jet 117 that is emitted by the source.

FIG. 8 illustrates the electric potential along the IEC thrust axis. It can be seen, moving from left to right in the figure, that the voltage is 0 at the vessel wall 211, due to its connection to ground, and rises as it approaches the positively biased electron guide 222. However, further movement toward the center of the device will show a sharp reduction in the voltage towards a minimum at the negatively biased accelerating grid voltage V (AG). Within the center of accelerating grid, the voltage again becomes positive, peaking at the center and falling off to a steady state level along the plasma jet path 216 within the cylindrical grid 215. Potential well theory predicts formation of a second virtual cathode at high ion currents.

The IEC source that has been disclosed would use a propellant comprising xenon, having a molecular weight of 131.3 amu this gas is selected because of ease of ionization but substitute gases such as cesium, argon, hydrogen, helium, methane, deuterium, cesium and even nitrogen may also be used. Where a carbon-based gas is used, the jet may contain microparticles, such as fullerents. As seen in FIG. 1, the vessel 111 itself may be made of a conductive material such as stainless steel while the electron guide 116, the accelerating is grid 114 and the cylindrical grid guide 115 may be made of materials such as stainless steel, tungsten molybdenum or vanadium having characteristics such as high melting point, high secondary electron coefficient, low electrical resistivity, high thermal conductivity and low sputtering yield. Non conductive vessel materials also may be used but additional grids are required.

On the basis of a −1 kV source 119 and a +100 V source 126, the device may develop a specific impulse of 3,000 s with a thrust of 34 mN and a jet power of 500 W. With these voltage values, the net accelerating potential would be approximately 600 V with a beam current of approximately 800 mA and an input of approximately 750–800 W. Evidencing the large effective transparency, the power loss to the grid is less 50 W and the power loss to propellant ionization is approximately 200–250 W. As a result, the overall thruster efficiency would be approximately 60–70%. Because the IEC device has a much greater effective transparency than planar electrostatic ion sources or thrusters, due to the coarseness of the grid wire or vane spacing and the formation of microchannels, the power loss is to the electrical grids is lower, even with multiple ion circulation through the IEC device before expulsion through the jet. The IEC device will have higher densities and temperatures in the central core plasma than those that are encountered in planar thrusters, but the increase in losses due to the bremsstrahlung radiation will be negligible. Thermal radiation losses are expected to be comparable to those of planar plasma devices. As a result, the energy expenditure per ion (power loss from ionization of the propellant) is less than the estimated 300 eV per ion for planar thrusters. In the IEC thruster, ions and electrons are recirculated before being ejected, and the ionization region is more effectively localized with the multiple grid system, providing better efficiency for the energy expended per full-speed exhaust ion.

Figure 9:
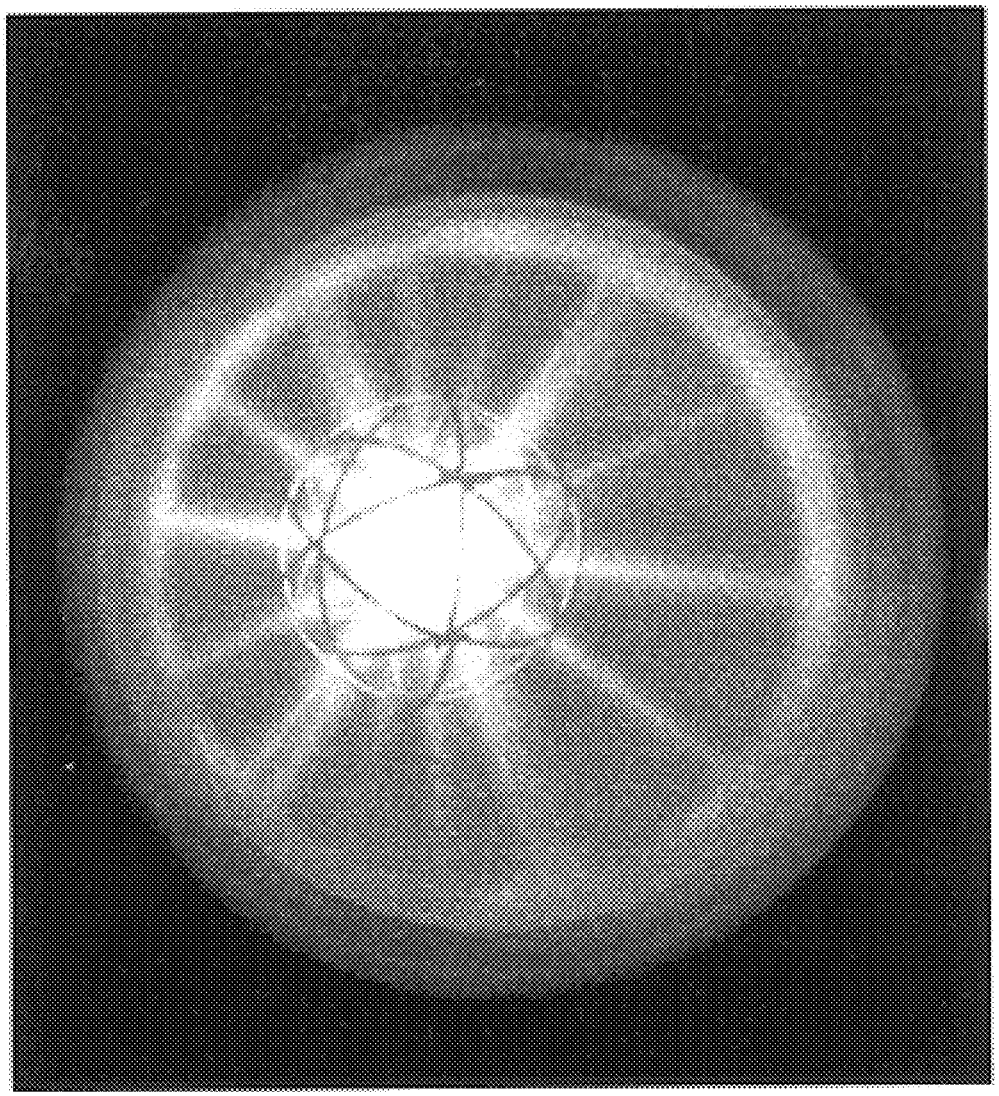
FIG. 9 is an illustration of the star mode for an IEC jet source showing microchannels developed during operation.

FIG. 9 is an illustration of the star mode which is present in an IEC device. This illustration shows the development of microchannels through the central grid openings, the microchannels extending from a central core region through the grid to the vessel walls.

The combination of pressure, volume and current parameters, and grid design will give sufficient local perturbation of the electric field so as to cause ions to deflect into channels. Such perturbations are achieved by a grid hole size that provides openings which cover a significantly larger portion of the total area of the grid sphere. Self-field forces further aid in constricting and maintaining the ion beams. As explained in the above referenced pending applications, for the spherical design, the ratio of the height of the grid opening surface of the sphere surface and sphere radius $R_c$ determines the degree of depression of the potential surface, in turn causing beam formation.

Figure 10:
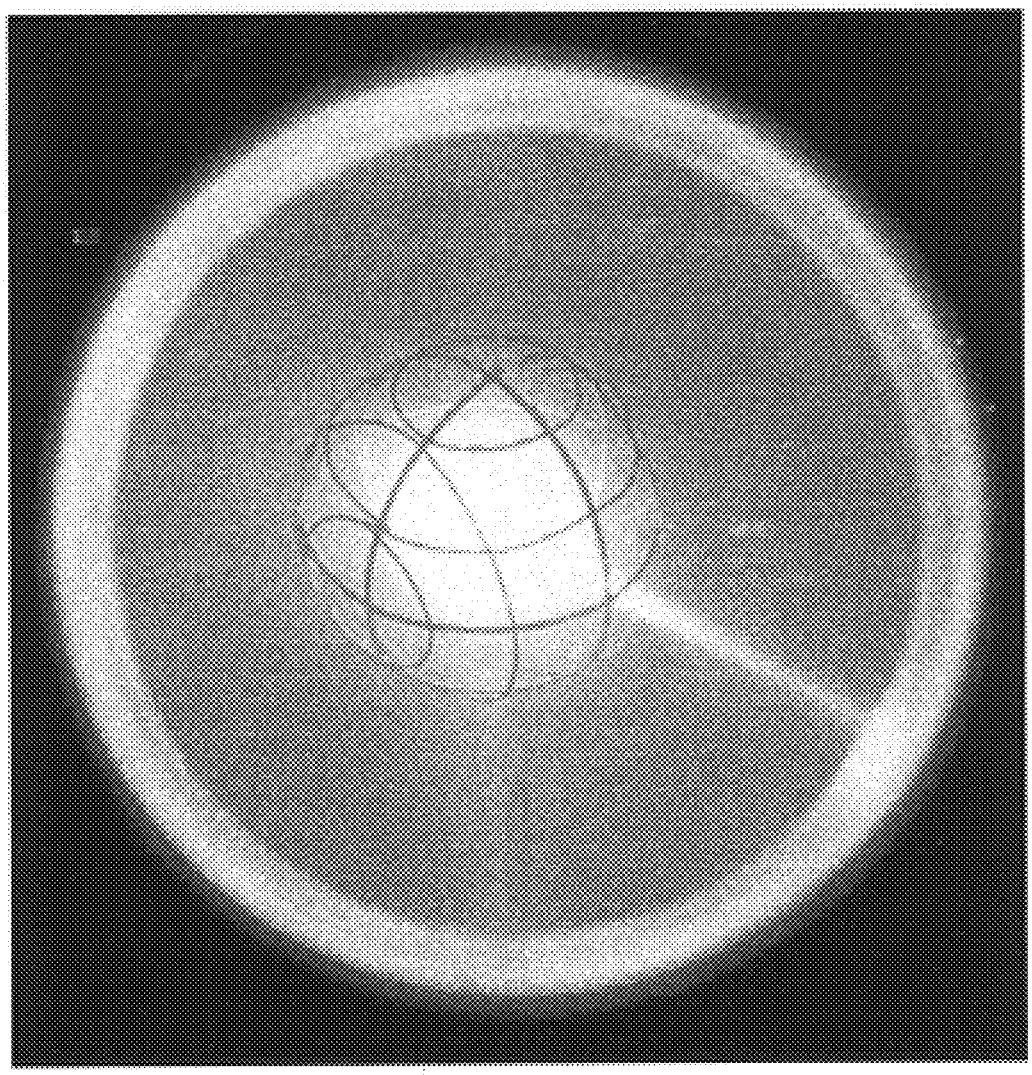
FIG. 10 is an illustration of the IEC thruster operating in a jet mode with a focus beam.

FIG. 10 is a photograph that illustrates a focused beam in an IEC thruster. The multiple microchannels have been substantially eliminated and the beam is focused through the cylindrical grid region from the central core to the external wall of the vessel, permitting a flow of the jet outside of the vessel to provide a thrust.

Figure 11:
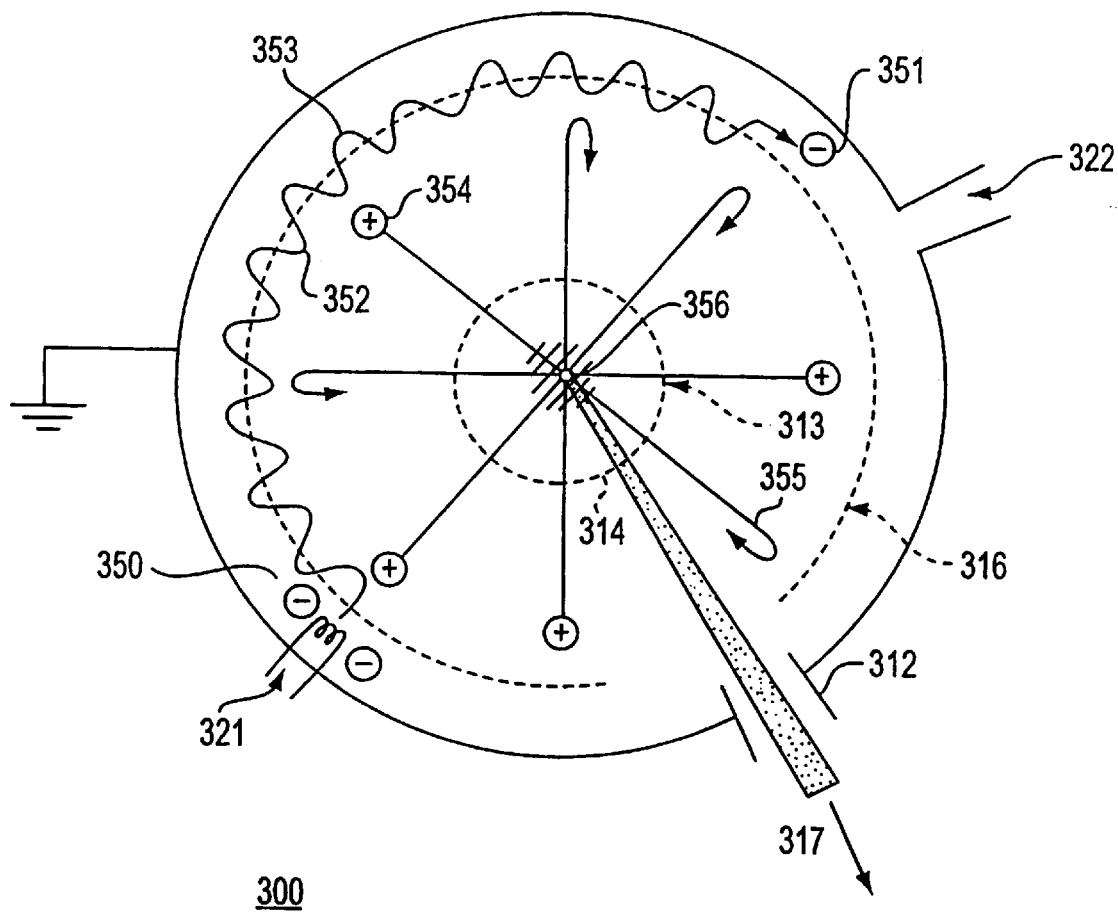
FIG. 11 is an illustration of an ionization process in an IEC jet source.

FIG. 11 is a photograph that illustrates the ionization process in an IEC thruster 300. The thrusters comprises a grounded vessel 311 which has an opening 322 for insertion of a propellant gas and an exit port 312 for the projection of a plasma jet 317. A spherical negative acceleration grid 313 is provided at the center of the vessel while a positive grid electron guide 316 is disposed concentrically around the negative acceleration grid, close to the vessel wall. The cylindrical guide grid is not shown for ease of illustration. In operation, an electron emitter 321 will generate electrons which flow along the positive grid electron guide from source locations 350 to intermediate points 351 along the guide. As the electrons flow along the guide, they will oscillate as a result of the action of the voltages and will produce positive ions 354. The ionized particles 354 will flow under control of the internal field created by the two grids through the center 356 of the vessel. The positive ions are repelled by the positive grid 316 and are returned again to the center for further action.

The design for the inertial electrostatic confinement source is not limited to a spherical design but may have a cylindrical design, elliptical design or other designs. The cylindrical design is based upon the use of a plasma target created at the center of the chamber by the intersection of multiple ion beams. Using other geometric designs, such as cylindrical designs, a similar approach to the creation of ion streams and the deflection of the ions into a thrusting plasma jet would provide a similar result. Such designs would promise good efficiency, low weight and, due to very open accelerator grid structure, a long lifetime. Any viable source of on board stored, collected or generated electric power may be conditioned to provide the required voltages and currents.

Several preferred embodiments of the IEC ion source have been defined. For example, the apparatus for producing a single narrow plasma jet may be a 32-cm diameter vacuum chamber having therein a 5-cm diameter grid comprised of 2 opposing hexagonal holes with diameter 2.5 cm, 12 equilateral triangles with 2.5-cm sides, and 12 equilateral triangles with 1.5-cm sides, 3 to 5 millitorr Argon gas chamber pressure, 1 to 4 kV grid voltage, and 1 to 20 Ma electrode current. The single narrow plasma jet passes through the hexagonal hole.

Another embodiment comprises a 31-cm diameter vacuum chamber having therein a 7.5-cm diameter electrical grid with a 1.8-cm diameter enlarged circular hole, and a 10 to 20 Ma electrode current applied a single narrow plasma jet passes through the enlarged circular hole.

Yet a further design produces six individual narrow plasma jets for the following design configuration and operational conditions. Specifically, there is a 31-cm diameter vacuum chamber, a 3-ring ellipsoid electrical grid with a 6-cm minor axis and 8-cm major axis with a geometric transparency of 95%, 1 to 10 millitorr Deuterium gas chamber pressure, 20–30 kV grid voltage and 5–15 Ma electrode current.

As a final example, the apparatus can be configured to produce one dominant jet and a minor diametrically opposed jet under the following design configuration and operating conditions. Within the spherical vacuum chamber is a grid consisting of 7 rings of 0.2 mm thick 35 mm O.D. 29 mm I.D. assembled to create a spherical grid with 3 rings that intersect at the north and south poles. The remaining 4 rings are arranged to establish a recurring uniform a pattern of triangular holes. The anode chamber wall has a 230 mm inside diameter. A $7–9\times10^{-3}$ m bar pressure of deuterium gas is provided in the chamber, with a several of 10–40 mA, and a voltage of 5–15 kV. The jet exits via the largest triangular hole.

In addition to methane as a reactive carbon based gas, other carbon-based gases such as methane, ethane, butane, pentane, propane, benzene, ethylene, propylene, butane, acetylene, carbon monoxide, carbon dioxide, linear hydrocarbons, aromatic hydrocarbons or carbons halides can be used.

Further, in addition to the use of xenon, argon and helium as a buffer gas, methane, ethane, butane, pentane, propane, benzene, ethylene, propylene, butane, acetylene, carbon monoxide, carbon dioxide, nitrogen, oxygen, or a noble gas can be used.

We claim:

1. Apparatus for producing complex carbon molecules comprising:
 a. a vacuum vessel for containment of at least low pressure gases and plasma, said vessel comprising:
  (i) a wall portion having at least one opening that can be hermetically sealed to allow removal of solid phase reaction produces from within said vessel, and (ii) a first conductive structure providing a conductive surface within said vessel;
b. a second conductive structure, formed as a grid within said vacuum vessel and internal of said first conductive structure, and being highly transparent to flowing ions and electrons, said second conductive structure being operative as a cathode when biased to a negative voltage relative to said first conductive structure;
c. means for flowing at a controlled rate a neutral gas mixture of a carbon-based gas and a buffer gas into said vessel;
d. means of maintaining a low pressure within said vessel by extraction of unreacted gases and gaseous reaction products;
e. a high-voltage feed-through insulator system which provides electrical power at a negative voltage from a power source to said second conductive structure at a value sufficient to create a plasma discharge;
f. a high-voltage power source capable of at least one of continuous regulated direct current and repetitive pulsed current operation, at a power level sufficient to create a plasma discharge capable of dissociating said carbon-based gas into carbon and associated species.

2. The apparatus as recited in claim 1 further comprising: a means of carbon soot extraction for removal and collection of said complex carbon molecules.

3. The apparatus as recited in claim 2 further comprising: a means to "wash down" accumulated carbon soot from within the vessel.

4. The apparatus as recited in claim 1 wherein said carbon-based gas comprises at least one of methane, ethane, butane, pentane, propane, benzene, ethylene, propylene, butane, acetylene, carbon monoxide, and carbon dioxide.

5. The apparatus as recited in claim 4 wherein said buffer gas primarily comprises at least one of xenon, argon and helium.

6. The apparatus according to claim 1 further comprising:
a. at least one enlarged second opening in said second conductive structure operative to distort a local electrical potential surface and at least one third opening in said first conductive structure aligned with a corresponding one of said at least one second opening such that a plasma jet is formed and flows outward from a volume within said second conductive structure through said second and corresponding first openings;
b. said vacuum vessel having within a wall portion at least one first opening to allow said plasma jet to escape from within said chamber and carry with it reaction products including ions and molecular species.
c. said at least one wall opening in said vacuum vessel being aligned with corresponding ones of said at least one aligned opening in said first conductive structure and said at least one enlarged opening to allow plasma formed within said vessel to emerge from the vessel as a plasma jet;
d. at least one third conductive structure, being substantially cylindrical, transparent, grid and defined by a longitudinal axis passing through centers of said corresponding openings in said vacuum vessel wall, first conductive structure and second conductive structure, said third conductive structure being biased to the same voltage as said second conductive structure when acting as a cathode, but electrically insulated from said first conductive structure, such that said third conductive structure is operative as a guide channel for said plasma jet.

7. The apparatus according to claim 6 further comprising a plurality of electron emitters disposed inside said vacuum chamber for providing a source of electrons, said electron emitters being electrically insulated from said first conductive structure and said second conductive structure, said emitters being disposed proximate to at least one of said aligned openings to prevent negative charge build-up of a contained plasma during plasma jet generation.

8. The apparatus according to claim 6 further comprising a high volume insulator means for maintaining the electric potential difference between the negatively-biased third structure and said first conductive structure.

9. The apparatus according to claim 8 wherein said insulator means is structured to cover said first conductive structure proximate said first opening and lines the inside of said first opening through which the plasma jet passes.

10. The apparatus according to claim 6 wherein said first conductive structure and said second conductive structure are substantially spherical and further comprising an intermediate conductive structure that lies between said first and second conductive structures, said intermediate structure being highly transparent to ion and electron flows and being biased to a voltage that is positive relative to the first conductive structure potential.

11. The apparatus according to claim 10 wherein said intermediate structure is spherically shaped and has a grid construction.

12. The apparatus according to claim 11 wherein said high-voltage feed-through insulator system is operative to permit electrical power at a high negative voltage to be provided to said second conductive structure, and provides electrical power at a low positive voltage to said intermediate conductive structure.

13. The apparatus according to claim 10 wherein said intermediate conductive structure comprises an electron guide grid operative to localize electron paths around the grid, thus, enhancing the ionization rate of a background neutral gas, a portion of said electron guide grid having at least one fourth opening which is aligned with corresponding ones of said first, second and third openings for passing a plasma jet.

14. The apparatus according to claim 13, wherein said high-voltage feed-through insulator system provides insulation at least from said first opening to said fourth opening.

15. The apparatus according to claim 10 wherein said intermediate conductive structure comprises a partial sphere which does not extend uniformly within the entire device.

16. The apparatus according to claim 10 wherein said electron emitters are disposed in a space between said first conductive structure and said intermediate conductive structure.

17. The apparatus according to claim 10 wherein said intermediate conductive structure is maintained at a positive potential in a range of 100 V to 1000 V.

18. The apparatus according to claim 10 wherein said second conductive structure is biased in a range of −0.1 Kv to −150 Kv.

19. The apparatus according to claim 10 wherein said second conductive structure comprises polygonal grid elements.

20. The apparatus according to claim 6 further comprising electrically insulated support means for maintaining the relative positions of said first conductive structure, said second conductive structure and said intermediate conductive structure.

21. The apparatus according to claim 6 which operates with an electrical current to the second conductive structure of 0.005 to 10 Amperes.

22. The apparatus according to claim 6 which produces a single narrow plasma jet having a thickness in a range of 1–5 cm, wherein said first conductive structure comprises a spherical vacuum chamber having a diameter within a range of 20–40 cm, said second conductive structure comprises a spherical grid having a diameter within a range of 4–25 cm smaller than said chamber, said first opening comprising one of a circular or a polygonal hole.

23. The apparatus according to claim 6 wherein said cathode grid has one or more openings enlarged to increase the enclosed area by >10% compared to neighboring openings such that the local electric field is distorted extracting ions and electrons to form a plasma jet flowing from inside said cathode grid out through said at least one enlarged second opening.

24. The apparatus according to claim 6 wherein said grid, biased to act as a cathode, interacts with the flowing ions and electrons to create a potential structure which traps and re-circulates ions and electrons until they can escape through the said enlarged opening in the grid due to the associated local electric potential distortions.

25. The apparatus according to claim 6 further comprising a second vessel which is conditioned to provide a pressure lower or equal to that of said vacuum vessel and the plasma jet from operation of said vacuum vessel apparatus flows into the second vessel where, after cooling and further recombination, microparticles and/or complex carbon molecules will precipitate into a collection location.

26. The apparatus of claim 25 where said second vessel is adapted to be coupled to a plurality of vacuum vessels such that the plasma jets from each vacuum vessel flows into said second vessel.

27. The. apparatus of claim 26 wherein the second vessel incorporates an opening with appropriate vacuum valving such that accumulated complex carbon molecules products can be removed periodically or continuously.

28. The apparatus according to claim 26 wherein said vacuum vessels are operable at internal pressures at least within a range of 0.1 to 100 mTorr.

29. The apparatus according to claim 26 wherein said apparatus comprises a device for mechanically concentrating the soot particles within the said reaction vessels and within the shared second gas containment vessel.

30. The apparatus according to claim 26 wherein said apparatus further comprises individual isolation valves between the vacuum vessel and at least one shared second gas containment vessel.

31. The apparatus according to claim 26 wherein said apparatus further comprises a "wash down" system to spray an appropriate liquid onto the internal surfaces of the gas containment vessels in order to remove accumulated soot.

32. The apparatus according to claim 26 wherein said apparatus uses a plurality of pulsed power source in parallel with the steady-state direct current power supply during generation of plasma jets.

33. The apparatus of claim 25 further comprising mechanical means for increasing the compaction of the soot particles.

34. The apparatus of claim 25 further comprising means for removing the compacted soot from the second gas containment vessel without the disturbance of the continuous or quasi continuous production process or gas pressure within the second and first gas containment vessels.

35. The apparatus according to claim 6 where said apparatus further comprises plural valved access ports for inserting or removing components and accumulated solid reaction product.

36. The apparatus according to claim 6 wherein said apparatus comprises at least one access port for visual/optical-microscopic inspections of the plasma discharge and jets.

37. The apparatus according to claim 6 wherein said apparatus further includes an electrostatic deceleration means consisting of two hollow electrodes position coaxially about the jet and within the second chamber wherein a first hollow electrode is at ground potential and the second hollow electrode is positively biased at a voltage of between 10 and 30 kV such that the voltage applied is optimized to decelerate remaining charged particles, both electrodes being of the same diameter and mounted for correct electrical insulation.

38. The apparatus of claim 6 wherein said carbon-based gas comprises at least one of linear hydrocarbons, aromatic hydrocarbons or carbons halides.

39. The apparatus as recited in claim 6 wherein said buffer gas primarily comprises at least one of nitrogen, oxygen, or a noble gas.

40. The apparatus according to claim 1 where said vacuum vessel, said first conductive structure and said second conductive structure are substantially spherical in shape with their centers co-located and said second conductive structure composed of wire or ribbon structures with greater than 80% transparency.

41. The apparatus according to claim 40 wherein said second conductive structure is biased to act as a cathode and interacts with the flowing ions and electrons to create a spherically symmetric electrical potential structure such that ions with different change-to-mass ratio are preferentially concentrated in different spherical shell regions within the potential structure.

42. The apparatus according to claim 41, wherein carbon and hydrogen or oxygen atoms, formed by dissociation of said carbon-based gas species during a plasma discharge operation, are partially separated by preferential concentration in different spherical shell regions within the electrical potential structure formed within the spherical grid volume.

43. The apparatus according to claim 42, wherein carbon atoms are concentrated in a small spherical volume at the center of the spherical grid volume.

44. The apparatus according to claim 41, further comprising means to rapidly turn off the cathode voltage such that carbon ions in the plasma concentrated near the center of the spherical grid volume recombine, providing complex carbon molecules.

45. The apparatus according to claim 44, wherein the cathode grid voltage is repeatively pulsed at rates from 1–100 Hz, providing continuous production of complex carbon molecules.

46. The apparatus according to claim 1 wherein said first conductive structure is biased at one of ground or a zero electrical potential, and said second conductive structure is biased to a negative potential.

47. The apparatus according to claim 1 which operates with a neutral gas pressure between 0.1 and 100 mTorr.

48. The apparatus according to claim 1, wherein said vacuum vessel and said first conductive structure are a single structure and said single structure and said second structure are substantially spherical, wherein said apparatus produces a plurality of individual narrow plasma jets, wherein the vessel defined by said first conductive structure has a diameter within the range of 20–40 cm, the grid defined by said second conductive structure comprises a plural-ring electrical grid and said geometric transparency is greater than 85%.

49. The apparatus according to claim 48 wherein said grid has a diameter of 5–20 cm smaller than that of the surrounding first conductive structure.

50. A method for producing complex carbon molecules comprising:
   a. establishing an enclosed volume for containment of at least a low pressure gas and plasma;
   b. providing within said enclosed volume a first conductive structure and a second conductive structure formed as a grid within said first conductive structure that is highly transparent to flowing ions and electrons;
   c. flowing at a controlled rate a neutral gas mixture of a carbon based gas and a buffer gas;
   d. biasing said second conductive structure to a negative voltage relative to said first conductive structure and applying one of continuous regulated direct current or repetitive pulsed current to said first conductive structure;
   e. applying electrical power at a negative voltage to said second conductive structure at a value sufficient to create a plasma discharge and cause a reaction comprising a dissociation of said carbon based gas, and creating an electrical potential structure within the enclosed volume such that higher mass reaction products are preferentially concentrated at the center of the volume; and
   f. causing said gaseous reaction products to recombine to form a carbon soot containing fullerenes within said volume.

51. The method as recited in claim 50 further comprising the step of collecting and compacting said carbon soot for collection.

52. The method as recited in claim 51 wherein said carbon-based gas comprises at least one of methane and benzene.

53. The method as recited in claim 51 wherein said buffer gas primarily comprises at least one of xenon, argon and helium.

54. The method according to claim 51 wherein said second conductive surface distorts a local electrical potential surface such that a plasma jet is formed and flows out from inside said second conductive structure.

55. The method according to claim 54 further comprising an added conductive structure that defines a path from within the enclosed volume to allow a plasma jet to escape carry with it reaction products including fullerenes.

56. The method according to claim 55 wherein said path as defined by a longitudinal axis being orthogonal to a surface of said first conductive structure and said second conductive structure.

57. The method of claim 56 further comprising suppressing the electrical potential along said longitudinal axis for providing a guide-channel for a plasma jet escaping from within said second conductive structure.

58. The method of claim 55 comprising emitting electrons inside said volume to prevent negative charge build-up of a contained plasma.

59. The method according to claim 54 wherein said first conductive structure and said second conductive structure are substantially spherical, and further comprising providing an intermediate spherical-shaped grid structure that lies between said first and second conductive structures, said intermediate grid structure being highly transparent to ion and electron flows, biasing said intermediate conductive structure to a voltage that is positive relative to a first conductive structure potential such that said intermediate conductive structure provides a guide path for electrons from emitters located on, but electrically insulated from, the first conductive surface, thus providing an intense ionization region along the electron guide path.

60. The method according to claim 59 further comprising electrically insulating said first, second and intermediate structures and providing electrical power at a high negative voltage to said second conductive structure, and electrical power at a low positive voltage to said intermediate structure.

61. The method according to claim 59 wherein said intermediate electron grid guide is biased positive in a range of 100 V to 1000 V.

62. The method according to claim 59 wherein said second conductive structure is biased range of −0.1 Kv to −150 Kv.

63. The method according to claim 59 further comprising providing a second vessel conditioned to provide a lower or equal pressure compared to said enclosed volume and in communication with said enclosed volume such that matter ejected from said enclosed volume as hot ionized or neutrally charged gas containing a substantial fraction of the carbon "soot" is accumulated within the second vessel.

64. The method as recited in claim 50 further comprising washing accumulated carbon soot from associated electrical components.

65. The method of claim 50 wherein said carbon-based gas comprises at least one of linear hydrocarbons, aromatic hydrocarbons or carbons halides.

66. The method as recited in claim 50 wherein said buffer gas primarily comprises at least one of nitrogen, oxygen, or a noble gas.

67. A method for complex carbon molecule production, using one or more vessels producing intense heating of carbonaceous gas, containment of the more massive atomic and molecular species, separation of the less massive atomic or molecular species, a plasma jet of the various species, ejection of the jet from the plasma producing vessel into a "soot" collection vessel equipped with a "soot" removal apparatus which preserves the lower operating pressure of said vessels, said method comprising:
   a. operating a first conductive structure as a first gas containment vessel with a wall portion having at least a first opening to allow a plasma jet to escape from within said vessel;
   b. forming a second conductive structure as a grid within said first conductive structure that is highly transparent to flowing ions and electrons, said second conductive structure being operative to act like a cathode grid when biased to a negative voltage and having a second opening in said grid-type structure, said second opening being enlarged and operative to distort a local electrical potential surface such that a plasma jet flows out from inside the grid through said second opening;
   c. flowing at a controlled rate a neutral gas mixture containing carbonaceous species and non-chemically reactive buffer gas into said gas containment vessel;
   d. providing electrical power at a negative voltage from a power source to said cathode grid at a value sufficient to create a plasma discharge;
   e. causing plasma formed within said vessel to emerge from the vessel as a plasma jet and enters a second vessel;
   f. a second gas containment vessel to which one or more of said first gas containment vessels are hermetically attached such that the jets emerging from the vessels are directed into the second vessel; and g. decelerating the jet plumes within the second gas containment vessel so that the micro-particles or large fullerene molecules or "soot" will precipitate as fullerene particles.

68. The method of claim 67 further comprising biasing said first conductive structure at one of ground or a zero electrical voltage and said second conductive structure to a negative potential.

69. The method of claim 68 further comprising biasing a path for said jet to the same voltage as said second conductive structure when acting as a cathode.

70. The method of claim 67 further comprising compacting and removing complex carbon particles from the second gas containment vessel.

71. The method of claim 70 further comprising a continuous or quasi continuous production process.

* * * * *